(12) United States Patent
Zajaczkowski et al.

(10) Patent No.: US 9,708,509 B2
(45) Date of Patent: Jul. 18, 2017

(54) ADHESIVES AND RELATED METHODS

(71) Applicant: Avery Dennison Corporation, Glendale, CA (US)

(72) Inventors: Michael Zajaczkowski, Bellefonte, PA (US); Michael T. Waterman, Chardon, OH (US); Kyle R. Heimbach, Millmont, PA (US); Eric L. Bartholomew, Mill Hall, PA (US); Brandon S. Miller, Lock Haven, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/433,889

(22) PCT Filed: Oct. 10, 2013

(86) PCT No.: PCT/US2013/064187
§ 371 (c)(1),
(2) Date: Apr. 7, 2015

(87) PCT Pub. No.: WO2014/059055
PCT Pub. Date: Apr. 17, 2014

(65) Prior Publication Data
US 2015/0267090 A1 Sep. 24, 2015

Related U.S. Application Data

(60) Provisional application No. 61/711,386, filed on Oct. 9, 2012.

(51) Int. Cl.

| | |
|---|---|
| C08F 2/46 | (2006.01) |
| C08F 2/50 | (2006.01) |
| C08G 61/04 | (2006.01) |
| C09J 7/02 | (2006.01) |
| C09J 4/06 | (2006.01) |
| C09J 123/02 | (2006.01) |
| C09J 133/00 | (2006.01) |
| C08L 23/02 | (2006.01) |
| C08L 33/00 | (2006.01) |
| C09J 133/08 | (2006.01) |
| C09J 4/00 | (2006.01) |
| C08K 5/13 | (2006.01) |
| C08K 5/3442 | (2006.01) |
| C09J 133/14 | (2006.01) |
| C09J 5/06 | (2006.01) |

(52) U.S. Cl.
CPC .............. *C09J 7/0207* (2013.01); *C08K 5/13* (2013.01); *C08K 5/3442* (2013.01); *C08L 23/02* (2013.01); *C08L 33/00* (2013.01); *C09J 4/00* (2013.01); *C09J 4/06* (2013.01); *C09J 5/06* (2013.01); *C09J 7/0289* (2013.01); *C09J 123/02* (2013.01); *C09J 133/00* (2013.01); *C09J 133/08* (2013.01); *C09J 133/14* (2013.01); *C09J 2205/114* (2013.01); *C09J 2205/31* (2013.01); *C09J 2400/243* (2013.01); *C09J 2433/00* (2013.01)

(58) Field of Classification Search
CPC ...................................................... C09J 133/08
USPC ... 522/154, 153, 150, 1, 161, 157, 184, 182, 522/178, 6, 71, 189; 520/1
See application file for complete search history.

(56) References Cited

U.S. PATENT DOCUMENTS

| | | |
|---|---|---|
| 3,619,270 A | 11/1971 | Tesch |
| 3,639,500 A | 2/1972 | Muny et al. |
| 4,002,601 A | 1/1977 | Hajek et al. |
| 4,049,483 A | 9/1977 | Loder et al. |
| 4,135,033 A | 1/1979 | Lawton |
| 4,143,858 A | 3/1979 | Schmidt, III et al. |
| 4,590,230 A | 5/1986 | Kamada et al. |
| 4,713,273 A | 12/1987 | Freedman |
| 4,914,253 A | 4/1990 | Chang |
| 5,024,880 A | 6/1991 | Veasley et al. |
| 5,189,176 A | 2/1993 | Blum et al. |
| 5,194,486 A | 3/1993 | Levine et al. |
| 5,252,694 A | 10/1993 | Willett et al. |
| 5,264,532 A | 11/1993 | Bernard |
| 5,348,589 A | 9/1994 | Arai et al. |
| 5,462,797 A | 10/1995 | Williams et al. |
| 5,468,652 A | 11/1995 | Gee |
| 5,593,759 A | 1/1997 | Vargas et al. |
| 5,625,006 A | 4/1997 | Callahan, Jr. et al. |
| 5,645,764 A | 7/1997 | Angelopoulos et al. |
| 5,695,837 A | 12/1997 | Everaerts et al. |

(Continued)

FOREIGN PATENT DOCUMENTS

| | | |
|---|---|---|
| CN | 101000899 | 7/2007 |
| CN | 101230177 | 7/2008 |

(Continued)

OTHER PUBLICATIONS

Nakanishi et al, WO 2012-035958 Machine Translation, Mar. 22, 2012.*
International Preliminary Report on Patentability issued in corresponding IA No. PCT/US2013/064187 dated Apr. 14, 2015.
International Search Report and Written Opinion issued in corresponding IA No. PCT/US2013/064187 dated Dec. 6, 2013.
International Preliminary Report on Patentability issued in corresponding IA No. PCT/US2013/064188 dated Apr. 14, 2015.
International Search Report and Written Opinion issued in corresponding IA No. PCT/US2013/064188 dated Dec. 20, 2013.
International Preliminary Report on Patentability issued in corresponding IA No. PCT/US2013/064189 dated Apr. 14, 2015.

(Continued)

*Primary Examiner* — Jessica E Whiteley
(74) *Attorney, Agent, or Firm* — Avery Dennison Corporation

(57) ABSTRACT

Cure in place pressure sensitive adhesive compositions are described that comprise one or more of a bodying component, a structural diluent, a radical diluent as well as additives such as crosslinkers, external catalysts, photoinitiators and stabilizers/process aids. The bodying component can be acrylic or non-acrylic.

17 Claims, 6 Drawing Sheets

(56) References Cited

U.S. PATENT DOCUMENTS

| | | |
|---|---|---|
| 5,721,289 A | 2/1998 | Karim et al. |
| 5,800,724 A | 9/1998 | Habeger et al. |
| 5,907,018 A | 5/1999 | Mazurek et al. |
| 5,951,786 A | 9/1999 | Gee et al. |
| 6,011,307 A | 1/2000 | Jiang et al. |
| 6,077,527 A | 6/2000 | Tan et al. |
| 6,106,982 A | 8/2000 | Mientus et al. |
| 6,204,350 B1 | 3/2001 | Liu et al. |
| 6,228,486 B1 | 5/2001 | Kittel et al. |
| 6,319,979 B1 | 11/2001 | Dubois et al. |
| 6,344,515 B1 | 2/2002 | Parikh et al. |
| 6,353,037 B1 | 3/2002 | Thunhorst et al. |
| 6,362,249 B2 * | 3/2002 | Chawla ............... 522/116 |
| 6,489,392 B1 | 12/2002 | Lappalainen et al. |
| 6,497,949 B1 | 12/2002 | Hyde et al. |
| 6,541,872 B1 | 4/2003 | Schrock et al. |
| 6,613,857 B1 | 9/2003 | Koch et al. |
| 6,641,911 B1 | 11/2003 | Puerkner et al. |
| 6,653,408 B1 | 11/2003 | St. Clair |
| 6,664,318 B1 | 12/2003 | Bymark et al. |
| 6,756,095 B2 | 6/2004 | Sandt et al. |
| 6,770,164 B1 | 8/2004 | Schrock et al. |
| 6,844,391 B1 | 1/2005 | Iyer et al. |
| 6,852,801 B1 | 2/2005 | Briggs et al. |
| 6,866,919 B2 | 3/2005 | Ikeguchi et al. |
| 7,088,248 B2 | 8/2006 | Forster |
| 7,144,751 B2 | 12/2006 | Gee et al. |
| 7,212,127 B2 | 5/2007 | Jacober et al. |
| 7,225,992 B2 | 6/2007 | Forster |
| 7,298,266 B2 | 11/2007 | Forster |
| 7,465,493 B2 | 12/2008 | Lu |
| 7,514,528 B2 | 4/2009 | Kauffman et al. |
| 7,517,579 B2 | 4/2009 | Campbell et al. |
| 7,524,911 B2 | 4/2009 | Karjala et al. |
| 7,575,653 B2 | 8/2009 | Johnson et al. |
| 7,691,437 B2 | 4/2010 | Ellis et al. |
| 7,786,868 B2 | 8/2010 | Forster |
| 7,875,500 B2 | 1/2011 | Inada et al. |
| 7,968,194 B2 | 6/2011 | Inada et al. |
| 7,968,195 B2 | 6/2011 | Inada et al. |
| 7,989,543 B2 | 8/2011 | Karjala et al. |
| 8,068,028 B2 | 11/2011 | Phaneuf |
| 8,080,177 B2 | 12/2011 | Long et al. |
| 8,168,035 B2 | 5/2012 | Uesugi et al. |
| 8,222,339 B2 | 7/2012 | Valvac et al. |
| 8,242,185 B2 | 8/2012 | Smith et al. |
| 8,287,949 B2 | 10/2012 | Maak et al. |
| 8,289,165 B2 | 10/2012 | Forster |
| 8,593,256 B2 | 11/2013 | Isabell |
| 8,617,930 B2 | 12/2013 | Inada et al. |
| 8,734,939 B2 | 5/2014 | Herr et al. |
| 9,023,954 B1 | 5/2015 | Wright |
| 9,040,155 B2 | 5/2015 | Ha et al. |
| 9,062,140 B2 | 6/2015 | Fujimaru et al. |
| 9,074,087 B2 | 7/2015 | Chen et al. |
| 9,181,365 B2 | 11/2015 | Malofsky et al. |
| 9,216,434 B2 | 12/2015 | Xiao et al. |
| 9,234,067 B2 | 1/2016 | Hayes et al. |
| 2002/0028326 A1 | 3/2002 | Lhila et al. |
| 2004/0091694 A1 | 5/2004 | Holzer et al. |
| 2004/0261839 A1 | 12/2004 | Gee et al. |
| 2005/0266237 A1 | 12/2005 | Asthana et al. |
| 2006/0128065 A1 | 6/2006 | Inada et al. |
| 2007/0021566 A1 | 1/2007 | Tse et al. |
| 2007/0036930 A1 | 2/2007 | Kontani et al. |
| 2007/0092733 A1 | 4/2007 | Yang et al. |
| 2007/0231571 A1 | 10/2007 | Lane et al. |
| 2007/0261785 A1 * | 11/2007 | Izumi ............... C08F 2/46 |
| | | 156/272.2 |
| 2008/0160300 A1 | 7/2008 | Hwang et al. |
| 2008/0171187 A1 | 7/2008 | Inada et al. |
| 2008/0281047 A1 | 11/2008 | Kishioka |
| 2009/0075008 A1 | 3/2009 | Hwang et al. |
| 2009/0194320 A1 | 8/2009 | Okumura |
| 2010/0101723 A1 | 4/2010 | Okamoto et al. |
| 2010/0112346 A1 | 5/2010 | Kondou et al. |
| 2010/0120931 A1 | 5/2010 | Zajaczkowski et al. |
| 2010/0200063 A1 | 8/2010 | Djeu |
| 2010/0233467 A1 | 9/2010 | Niwa et al. |
| 2010/0314813 A1 | 12/2010 | Wojtowicki et al. |
| 2011/0045639 A1 * | 2/2011 | Masuko ............... C08G 65/3322 |
| | | 438/118 |
| 2011/0070434 A1 | 3/2011 | Hirose et al. |
| 2011/0159238 A1 * | 6/2011 | Kawamori ......... C08G 73/1042 |
| | | 428/141 |
| 2011/0177341 A1 | 7/2011 | Clark et al. |
| 2011/0213067 A1 | 9/2011 | Moeller et al. |
| 2011/0250446 A1 | 10/2011 | Higuchi et al. |
| 2011/0300709 A1 | 12/2011 | Shintani |
| 2012/0028380 A1 | 2/2012 | Takamoto et al. |
| 2012/0058334 A1 | 3/2012 | Okamoto et al. |
| 2012/0126380 A1 | 5/2012 | Uenda et al. |
| 2012/0171915 A1 | 7/2012 | Bartholomew et al. |
| 2012/0177901 A1 | 7/2012 | Hirose et al. |
| 2012/0185222 A1 | 7/2012 | Frepoli et al. |
| 2012/0237764 A1 | 9/2012 | Soejima et al. |
| 2012/0276376 A1 | 11/2012 | Yonezaki |
| 2012/0325402 A1 | 12/2012 | Suwa et al. |
| 2013/0034737 A1 | 2/2013 | Imoto et al. |
| 2013/0136874 A1 | 5/2013 | Xia et al. |
| 2013/0158176 A1 | 6/2013 | Hu et al. |
| 2013/0177758 A1 | 7/2013 | Shigetomi et al. |
| 2013/0190457 A1 | 7/2013 | Prenzel et al. |
| 2013/0233485 A1 | 9/2013 | Herr et al. |
| 2013/0273362 A1 | 10/2013 | Traser et al. |
| 2013/0330546 A1 | 12/2013 | Takami et al. |
| 2013/0344276 A1 | 12/2013 | Seitz et al. |
| 2014/0008821 A1 | 1/2014 | Toyoda et al. |
| 2014/0162082 A1 | 6/2014 | Gleason et al. |
| 2014/0213996 A1 | 7/2014 | Petersen et al. |
| 2014/0377554 A1 | 12/2014 | Cho et al. |
| 2015/0073110 A1 | 3/2015 | Malofsky et al. |
| 2015/0137089 A1 | 5/2015 | Kitazawa et al. |
| 2015/0140343 A1 | 5/2015 | Hattori et al. |
| 2015/0159053 A1 | 6/2015 | Schumann et al. |
| 2015/0299536 A1 | 10/2015 | Xiao et al. |
| 2016/0232821 A1 | 8/2016 | Janko |
| 2016/0257858 A1 | 9/2016 | Zajaczkowski et al. |
| 2017/0128615 A1 | 5/2017 | Bartholomew et al. |

FOREIGN PATENT DOCUMENTS

| | | |
|---|---|---|
| CN | 101641418 | 2/2010 |
| CN | 103108930 | 5/2013 |
| EP | 0400703 | 12/1990 |
| EP | 0471767 | 2/1992 |
| EP | 0529546 | 3/1993 |
| EP | 1045886 | 9/2003 |
| EP | 1479746 | 11/2004 |
| EP | 1311559 | 8/2006 |
| EP | 1792925 | 6/2007 |
| EP | 1358066 | 3/2010 |
| EP | 2236534 | 10/2010 |
| EP | 2414418 | 2/2012 |
| EP | 2552497 | 2/2013 |
| EP | 2643418 | 10/2013 |
| EP | 2759578 | 7/2014 |
| EP | 2831125 | 2/2015 |
| JP | 2001-288438 | 10/2001 |
| JP | 2002-285106 | 10/2002 |
| KR | 2008-0060604 | 7/2008 |
| WO | 97/33921 | 9/1997 |
| WO | 98/03603 | 1/1998 |
| WO | 00/42648 | 7/2000 |
| WO | 03/045120 | 5/2003 |
| WO | 2004/015019 | 2/2004 |
| WO | 2004/109786 | 12/2004 |
| WO | 2005/103178 | 11/2005 |
| WO | 2006/101699 | 9/2006 |
| WO | 2006/102016 | 9/2006 |
| WO | 2007/047513 | 4/2007 |
| WO | 2008/005501 | 1/2008 |
| WO | 2008/067503 | 6/2008 |
| WO | 2008/093398 | 8/2008 |

(56) References Cited

FOREIGN PATENT DOCUMENTS

| WO | 2008/093653 | | 8/2008 |
|---|---|---|---|
| WO | 2009/029476 | | 3/2009 |
| WO | 2009/133175 | | 11/2009 |
| WO | 2010/026172 | | 3/2010 |
| WO | 2010/074135 | | 7/2010 |
| WO | 2010/078611 | | 7/2010 |
| WO | 2010/112537 | | 10/2010 |
| WO | 2011/011729 | | 1/2011 |
| WO | 2011/084438 | | 7/2011 |
| WO | 2011/159716 | | 12/2011 |
| WO | 2011/159720 | | 12/2011 |
| WO | 2011/159722 | | 12/2011 |
| WO | 2011/159727 | | 12/2011 |
| WO | 2012/031825 | | 3/2012 |
| WO | 2012-035958 | * | 3/2012 |
| WO | 2012/071484 | | 5/2012 |
| WO | 2012/088384 | | 6/2012 |
| WO | 2012/129489 | | 9/2012 |
| WO | 2013/019492 | | 2/2013 |
| WO | 2013/055581 | | 4/2013 |
| WO | 2013/083670 | | 6/2013 |
| WO | 2013/096068 | | 6/2013 |
| WO | 2013-115851 | | 8/2013 |
| WO | 2013/148041 | | 10/2013 |
| WO | 2013/149165 | | 10/2013 |
| WO | 2014/018231 | | 1/2014 |
| WO | 2014/018312 | | 1/2014 |
| WO | 2014/116395 | | 7/2014 |
| WO | 2014/138166 | | 9/2014 |
| WO | 2015/042501 | | 3/2015 |
| WO | 2015/053807 | | 4/2015 |
| WO | 2015/195854 | | 12/2015 |
| WO | 2016/053933 | | 4/2016 |
| WO | 2016/127056 | | 5/2016 |

OTHER PUBLICATIONS

International Search Report and Written Opinion issued in corresponding IA No. PCT/US2013/064189 dated Dec. 18, 2013.
International Preliminary Report on Patentability issued in corresponding IA No. PCT/US2013/064190 dated Apr. 14, 2015.
International Search Report and Written Opinion issued in corresponding IA No. PCT/US2013/064190 dated Dec. 6, 2013.
International Search Report and Written Opinion issued in corresponding IA No. PCT/US2014/020553 dated Jul. 3, 2014.
International Search Report and Written Opinion issued in corresponding IA No. PCT/US2015/036322 dated Sep. 16, 2015.
"Dual-Stage Transformable Adhesives: Bridging the Gap Between PSAs and Structural Adhesives," The Adherent Technology Insights from Adhesives Research, vol. 2, Issue 3, Dual Stage Adhesives, © 2012, 1 page.
A.M. Travelpiece et al., "Dielectric Integrity of High-Temperature Nanocomposites," 2008 Annual Report Conference on Electrical Insulation Dielectric Phenomena, © 2008 IEEE, pp. 571-574.
Dr. Graeme A. Roan et al., "Radiation Curable Pressure Sensitive Adhesives," Presented at the Pressure Sensitive Tape Council Conference, May 2004.
James R. Erikson et al., "Kraton Liquid™ Polymer/Solid Polymer Hybrid UV Cure Adhesives with Stable Peel Strength," http://www.pstc.org/files/public/Roan.pdf, Presented at the Pressure Sensitive Tape Council Conference, May 2002, pp. 229-243.
Jong-Yeol Shin et al., "Electrical Properties of the Epoxy Nano-Composites According to Additive," Transactions on Electrical and Electronic Materials, vol. 10, No. 3, Jun. 25, 2009, pp. 97-101.
Joseph V. Koleske et al., "2008 Additive Guide (Impact-Resistance Improved-Zeolites)," Paint & Coatings Industry 24.6, Jun. 2008.
Kyle R. Heimbach, "Transposable Adhesives: Acrylic Pressure Sensitive Adhesives with Reactive Components," Presented at the Pressure Sensitive Tape Council Conference, May 2013.
M. Spath, "First Experiments on Module Assembly Line Using Back-Contact Solar Cells," Presented at the 23rd European Photovoltaic Solar Energy Conference, Valencia, Spain, Sep. 1-5, 2008.
M.S. Sreekanth et al., "Effect of Concentration of Mica on Properties of Polyester Thermoplastic Elastomer Composites," Journal of Minerals & Materials Characterization & Engineering, vol. 8, No. 4, pp. 271-282, 2009.
Robert Wigdorski, "Taking Pressure Sensitive Adhesves to a Different Level of Performance," https://www.pstc.org/files/public/Wigdorski08.pdf, 2008.
A. Gragossian et al., "Lase Ablation of Aluminum from Normal Evaporation to Phase Explosion," Journal of Applied Physics 105, 103304, 2009.
L. Tunna et al., "Micromachining of copper using Nd: YAG laser radiation at 1064, 532, and 355 nm wavelengths," Optics & Laser Technology 33, pp. 135-143, 2001.
"Handbook of Pressure Sensitive Adhesive Technology," Edited by D. Satas, p. 172, 1989.
Alphonsus V. Pocius, "The Chemical and Physical Properties of Elastomer-Based Adhesives," Adhesion & Adhesives Technology: An Introduction, pp. 230-231, 245, 1997.
Yili Wu, "Pressure Sensitive Adhesives Based on Oleic Acid," A Thesis Submitted to Oregon State University, Presented Jan. 10, 2014.
International Preliminary Report on Patentability issued in corresponding IA No. PCT/US2015/036322 dated Dec. 29, 2016.
International Preliminary Report on Patentability issued in corresponding IA. No. PCT/US2014/020553 dated Apr. 21, 2016.
International Search Report and Written Opinion issued in corresponding International Application No. PCT/US2016/016774 dated May 10, 2016.

* cited by examiner

ADHESIVES AND RELATED METHODS

CROSS REFERENCE TO RELATED APPLICATION

The present application is a 371 of International Application No. PCT/US2013/064187, which was published in English on Apr. 17, 2014, and claims priority from U.S. Provisional Application No. 61/711,386 filed on Oct. 9, 2012, both of which are incorporated herein by reference in their entireties.

FIELD

The present subject matter generally relates to reactive oligomers and/or compounds blended with an acrylate or vinyl-acrylate base polymer. In certain versions, a non-acrylate polymer is used in the blends. The blends result in a pressure sensitive adhesive (PSA) which contains a latent functionality on the oligomers and/or additives for cross-linking in place. Crosslinking can be triggered by surface catalysis, UV irradiation, or other cure mechanisms.

Specifically, the present subject matter is directed to pressure sensitive adhesive compositions, and more particularly, to pressure sensitive adhesives having high adhesion over a wide temperature range. The subject matter is also directed to cure in place liquid compositions. The subject matter is also directed to methods of forming and methods of using such compositions. The subject matter is further directed to foam articles incorporating the compositions.

SUMMARY

The present subject matter is generally directed to pressure sensitive adhesives which are cured in place by UV light, surface catalysis, or some other mechanism, and which attain much higher strength than typical PSAs. The adhesives are typically formed by blending reactive oligomers with one or more high molecular weight acrylate polymers. An example is a blend of a silane functional acrylic polymer and a silyl terminated polyether. The blend is inherently tacky and can be cured by exposing the blend to a compound containing an oligomeric silane such as may be printed on a mating surface.

In one embodiment, the pressure sensitive adhesive or cure in place composition of the subject matter is formed from a blend comprising: (a) a reactive oligomer and (b) a high molecular weight acrylate polymer. The blend is inherently tacky and is cured by exposing the blend to a compound containing an oligomeric silane which may be introduced by being printed on a surface.

Another embodiment of the subject matter is a cure in place pressure sensitive adhesive comprising: (a) 20-80 weight percent (wt %) of a bodying component comprising an acrylic base polymer having a molecular weight (Mw) of 5,000 to 1,000,000, in certain embodiments 15,000-250,000, and in still other embodiments 15,000-100,000, (b) 5-50 wt % of one or more structural diluents, (c) 10-80 wt % of one or more radical addition diluents, (d) 0-4.0 wt % of one or more crosslinkers, (e) 0-4.0 wt % of one or more external catalysts, (f) 0.01-10 wt % of one or more photoinitiators, and (g) 0-10.0 wt % of one or more stabilizer/process aids.

Yet another embodiment of the subject matter is a cure in place pressure sensitive adhesive comprising (a) 20-80 wt % of a bodying component comprising a base polymer having a Mw of 1,000 to 500,000, in certain embodiments 1,000-100,000, and in still other embodiments 1000-50,000, selected from the group consisting of polyolefins, polyvinyl aromatics, polyurethanes, polycarbonates, polyesters, polyethers, and combinations thereof, (b) 5-50 wt % of one or more structural diluents, (c) 10-80 wt % of one or more radical addition diluents, (d) 0-1.0 wt % of one or more crosslinkers, (e) 0-4.0 wt % of one or more external catalysts, (f) 0.01-10 wt % of one or more photoinitiators, and (g) 0-10.0 wt % of one or more stabilizer/process aids.

An additional embodiment of the present subject matter includes a cure in place pressure sensitive adhesive comprising: (a) 20-80 wt % of an acrylic base polymer having a Mw of 100,000 to 1,000,000, and in certain embodiments 250,000-750,000, (b) 0-30 wt % of one or more tackifiers, (c) 5-40 wt % of one or more liquid reactive components, (d) 0-30 wt % of an acrylic-epoxy functional component and/or epoxy functional olefin, and (e) 0-2 wt % of a metal chelate crosslinker-catalyst and/or external catalyst.

An additional embodiment of the present subject matter includes a cure in place pressure sensitive adhesive comprising: (a) 50-80 wt % of an acrylic base polymer having a Mw of 250,000-750,000, (b) 10-30 wt % of one or more structural diluents, (c) 0-0.5 wt % of a metal chelate crosslinker, (d) 0-2 wt % of one or more external catalysts, and (e) 0-10 wt % of stabilizer/process aid.

An additional embodiment of the present subject matter includes a cure in place pressure sensitive adhesive comprising: (a) 50-80 wt % of an acrylic base polymer having a Mw of 250,000-750,000, (b) 20-40 wt % of one or more structural diluents, (c) 0-30 wt % of an optional acrylic-epoxy functional component, (d) 0-0.5 wt % of a metal chelate crosslinker, (e) 0-2 wt % of one or more external catalysts, and (f) 0-10 wt % of stabilizer/process aid.

An additional embodiment of the present subject matter includes a cure in place liquid comprising: (a) 5-70 wt % of a bodying component comprising an acrylic base polymer having a Mw of 5,000 to 1,000,000, in certain embodiments 15,000-250,000, and in still other embodiments 15,000-100,000, (b) 5-40 wt % of one or more structural diluents, (c) 30-95 wt % one or more radical addition diluents, (d) 0-10.0 wt % one or more external catalyst, (e) 0-10 wt % one or more photoinitiators, (f) 0-10 wt % one or more photosensitizer, and (g) 0-10 wt % stabilizer(s).

An additional embodiment of the present subject matter includes a cure in place liquid comprising: (a) 5-50 wt % of a bodying component comprising an acrylic base polymer having a Mw of 15,000 to 100,000, (b) 50-95 wt % of one or more structural diluents, (c) 0.01-10 wt % one or more external catalysts, and (d) 0-10 wt % stabilizer/process aid.

An additional embodiment of the present subject matter includes a cure in place liquid comprising (a) 30-70 wt % of a bodying component comprising an acrylic copolymer having a Mw of 15,000-100,000, (b) 7-70 wt % of one or more structural diluents, (c) 7-70 wt % of one or more radical addition diluents, (d) 2-10 wt % of one or more photoinitiators, (e) 0-1% of one or more antioxidants, and (f) 0-10 wt % stabilizer/process aid.

An additional embodiment of the present subject matter includes a cure in place liquid comprising: (a) 5-70 wt % of a bodying component comprising an acrylic base polymer having a Mw of 5,000 to 1,000,000, in certain embodiments 15,000-250,000, and in still other embodiments 15,000-100, 000, (b) 5-80 wt % of one or more structural diluents, (c) 5-70 wt % one or more radical addition diluents, (d) 0-5.0 wt % one or more external catalysts, (e) 0-10 wt % of one or more photoinitiators, (f) 0-10 wt % of one or more photosensitizers, and (g) 0-10 wt % stabilizer/process aid.

An additional embodiment of the present subject matter includes a cure in place liquid comprising: (a) 10-15 wt % of a bodying component comprising an acrylic base polymer having a Mw of 15,000-100,000, (b) 45-60 wt % of one or more structural diluents, (c) 30-40 wt % of one or more radical addition diluents, (d) 0.01-2.0 wt % of one or more external catalysts, (e) 0.01-10 wt % photoinitiators, (f) 0-10 wt % of one or more photosensitizers, and (g) 0-10 wt % stabilizer/process aid.

An additional embodiment of the present subject matter includes a cure in place liquid comprising: (a) 5-70 wt % of a bodying component comprising a non-acrylic base polymer having a Mw of 1,000 to 500,000, in certain embodiments 1,000-100,000, and in still other embodiments 1,000-50,000, selected from the group consisting of polyolefins, polyvinyl aromatics, polyurethanes, polycarbonates, polyesters, polyethers, and combinations thereof, (b) 5-80 wt % of one or more structural diluents, (c) 0-40 wt % of one or more radical addition diluents, (d) 0-5.0 wt % of one or more external catalysts, (e) 0-10 wt % of one or more photoinitiators, (f) 0-10 wt % of one or more photosensitizers, and (g) 0-10 wt % stabilizer/process aid.

An additional embodiment of the present subject matter includes a cure in place liquid comprising: (a) 5-50 wt % of a bodying component comprising a non-acrylic polymer having a Mw of 5,000 to 1,000,000, and in certain embodiments 15,000-100,000, (b) 50-95 wt % of one or more structural diluents, (c) 0.01-10 wt % of one or more external catalysts, and (d) 0-10 wt % stabilizer/process aid. The non-acrylic polymer is selected from the group consisting of polyolefins, polyvinyl aromatics, polyurethanes, polycarbonates, polyesters, polyethers, and combinations thereof.

An additional embodiment of the present subject matter includes a cure in place liquid comprising: (a) 5-70 wt % of a bodying component comprising a non-acrylic base polymer having a Mw of 1,000 to 500,000, in certain embodiments 1,000-100,000, and in still other embodiments 1,000-50,000, selected from the group consisting of polyolefins, polyvinyl aromatics, polyurethanes, polycarbonates, polyesters, polyethers, and combinations thereof, (b) 5-80 wt % of one or more structural diluents, (c) 5-70 wt % of one or more radical addition diluents, (d) 0-5.0 wt % of one or more external catalysts, (e) 0-10 wt % of one or more photoinitiators, (f) 0-10 wt % of one or more photosensitizers, and (g) 0-10 wt % stabilizer/process aid.

An additional embodiment of the present subject matter includes a cure in place liquid comprising: (a) 10-15 wt % of a bodying component comprising a non-acrylic polymer having a Mw of 1,000 to 500,000, in certain embodiments 1,000-100,000, and in still other embodiments 1,000-50,000, (b) 45-60 wt % of one or more structural diluents, (c) 30-40 wt % of one or more radical addition diluents, (d) 0.01-2.0 wt % of one or more external catalysts, (e) 0.01-10 wt % of one or more photoinitiators, (f) 0-10 wt % of one or more photosensitizers, and (g) 0-10 wt % stabilizer/process aid. The non-acrylic polymer is selected from the group consisting of polyolefins, polyvinyl aromatics, polyurethanes, polycarbonates, polyesters, polyethers, and combinations thereof.

An additional embodiment of the present subject matter includes a cure in place liquid comprising: (a) 5-70 wt % of a bodying component comprising an acrylic base polymer having a Mw of 5,000 to 1,000,000, in certain embodiments 15,000-250,000, and in still other embodiments 15,000-100,000, (b) 5-70 wt % of a bodying component comprising a non-acrylic base polymer having a Mw of 1,000 to 500,000, in certain embodiments 1,000-100,000, and in still other embodiments 1,000-50,000, selected from the group consisting of polyolefins, polyvinyl aromatics, polyurethanes, polycarbonates, polyesters, polyethers, and combinations thereof, (c) 5-80 wt % of one or more structural diluents, (d) 0-40 wt % of one or more radical addition diluents, (e) 0-5.0 wt % of one or more external catalysts, (f) 0-10 wt % of one or more photoinitiators, (g) 0-10 wt % of one or more photosensitizers, and (h) 0-10 wt % stabilizer/process aid.

An additional embodiment of the present subject matter includes a cure in place liquid comprising: (a) 5-50 wt % of a bodying component comprising an acrylic base polymer having a Mw of 5,000 to 1,000,000, in certain embodiments 15,000-250,000, and in still other embodiments 15,000-100,000, (b) 5-50 wt % of a bodying component comprising a non-acrylic base polymer having a Mw of 1,000 to 500,000, in certain embodiments 1,000 to 50,000 selected from the group consisting of polyolefins, polyvinyl aromatics, polyurethanes, polycarbonates, polyesters, polyethers, and combinations thereof, (c) 50-95 wt % of one or more structural diluents, (d) 0.01-10 wt % of one or more external catalysts, (e) 0-10 wt % of one or more photosensitizers, and (f) 0-10 wt % stabilizer/process aid.

An additional embodiment of the present subject matter includes a cure in place liquid comprising: (a) 70-80 weight percent of a bodying component comprising an acrylic copolymer having a Mw of 15,000-250,000, and in certain embodiments 18,000-70,000, (b) 15-20 wt % of one or more structural diluents, (c) 0.01-5 wt % of one or more photoinitiators, and (d) 0-10 wt % stabilizer/process aid.

An additional embodiment of the present subject matter includes a cure in place liquid comprising: (a) 5-15 wt % of a bodying component comprising an acrylic base polymer having a Mw of 5,000 to 1,000,000, in certain embodiments 15,000-250,000, and in still other embodiments 15,000-100,000, (b) 5-15 wt % of a bodying component comprising a non-acrylic base polymer having a Mw of 1,000 to 500,000, in certain embodiments 1,000-100,000, and in still other embodiments 1,000-50,000, selected from the group consisting of polyolefins, polyvinyl aromatics, polyurethanes, polycarbonates, polyesters, polyethers, and combinations thereof, (c) 45-60 wt % of one or more structural diluents, (d) 30-40 wt % of one or more radical addition diluents, (e) 0.01-2.0 wt % of one or more external catalysts, (f) 0.01-10 wt % of one or more photoinitiators, (g) 0-10 wt % of one or more photosensitizers, and (h) 0-10 wt % stabilizer/process aid.

An additional embodiment of the present subject matter includes a cure in place liquid. The liquid comprises (a) 5-70 wt % of a bodying component comprising a non-acrylic base polymer having a Mw of 5,000 to 1,000,000, selected from the group consisting of polyolefins, polyvinyl aromatics, polyurethanes, polycarbonates, polyesters, polyethers, and combinations thereof; (b) 0-40 wt % of at least one structural diluent; (c) 30-95 wt % of at least one radical addition diluent; (d) 0-10.0 wt % of a curative; (e) 0-10 wt % photosensitizer; and (f) 0-10 wt % stabilizer.

Another embodiment of the present subject matter includes methods of curing pressure sensitive adhesives. Specifically, a method of curing a pressure sensitive adhesive comprises providing a cure in place pressure sensitive adhesive including 20-80 wt % of a bodying component comprising an acrylic base polymer having a Mw of 5,000 to 1,000,000, 5-50 wt % of at least one structural diluent, 10-80 wt % of at least one radical addition diluent, 0-10.0 wt % crosslinker, 0-4.0 wt % of a first curative, 0.01-10 wt % of a second curative, and 0-10.0 wt % stabilizer/process aid. The method also comprises exposing or subjecting the adhesive to a first stimulus selected from the group consisting of radiation, heat, moisture, pressure, ultrasound, chemical exposure, and combinations thereof.

Another embodiment of the present subject matter includes a cure in place pressure sensitive adhesive comprising (a) 50-80 wt % of an acrylic base polymer having a Mw of 250,000-750,000; (b) 10-30 wt % of at least one structural diluent; (c) 0-0.5 wt % of at least one metal chelate crosslinker; (d) 0-2 wt % of a curative; and (e) 0.1-10 wt % stabilizer/process aid.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION

Figure 1:
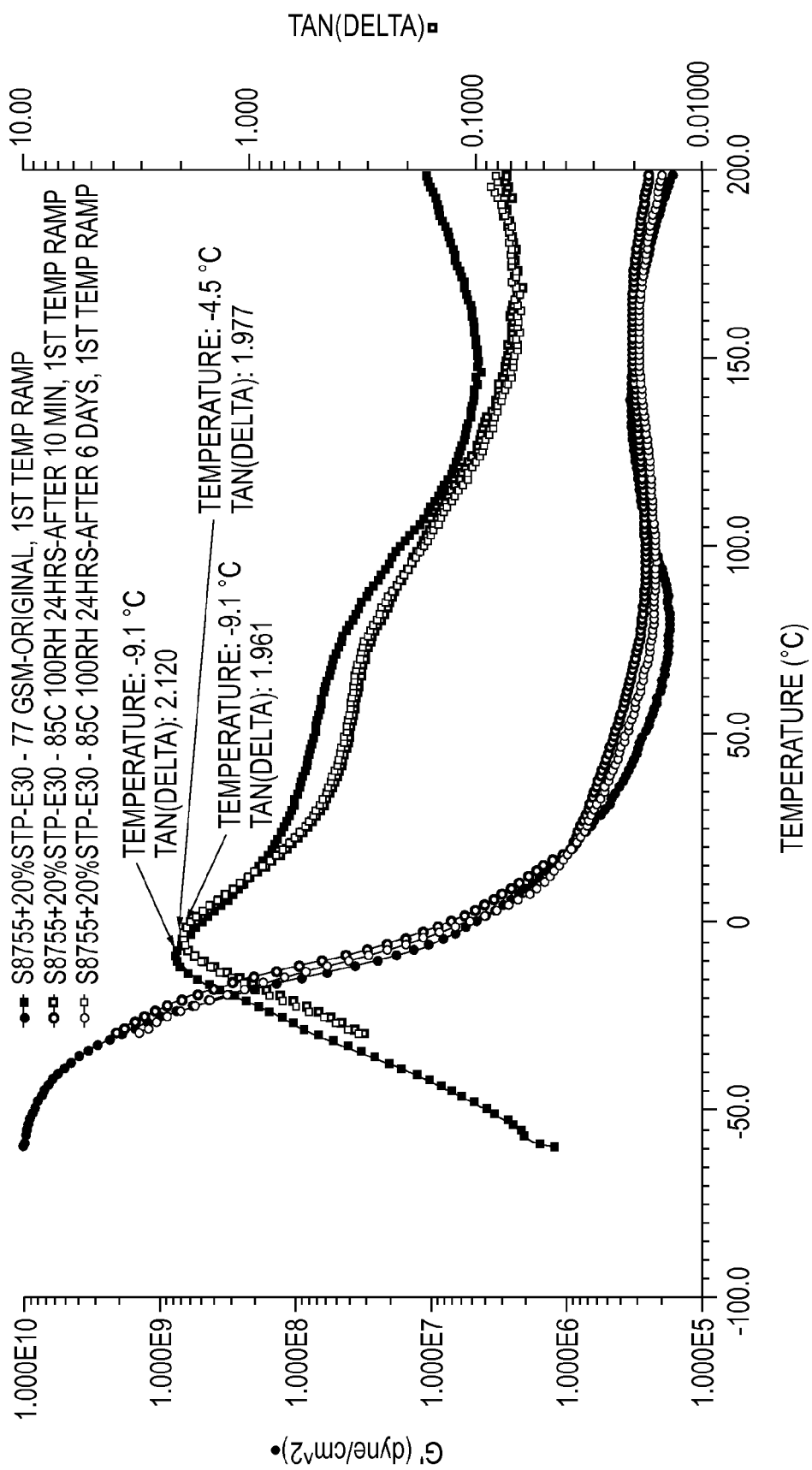
FIG. 1 depicts a dynamic mechanical analysis of certain embodiments of the cure in place pressure sensitive adhesive of Example 3.

In certain embodiments, the cure in place adhesives of the present subject matter include (i) a bodying component, which may be acrylic based or non-acrylic based or include combinations of acrylates and non-acrylates, (ii) one or more structural diluents, (iii) one or more radical addition diluents, and (iv) one or more additives such as (a) cross-linkers, (b) catalysts such as thermal catalysts and base catalysts, (c) photoinitiators including radical photoinitiators, UV radical photoinitiators and type I and II photoinitiators, (d) photosensitizers including dyes, and (e) stabilizers or process aids. An overview of the selections for the three main components (i)-(iii) is found in the following Table 1.

TABLE 1

Representative Listing of Main Components of Compositions

| Radical Addition Diluents | Bodying Components | Structural Diluents |
|---|---|---|
| ACE | EB14-24 | S-21 |
| Isostearyl acrylate | EB14-15 | S-28 |
| Heptadecyl acrylate | EB14-16 | Epon 828 |
| Dicyciopentadiene acrylate | EB14-04 | Epon 834 |
| THF acrylate | EB14-02 | A-186 |
| OXE-10 | EB14-03 | A-187 |
| OXE-30 | M112, carbonate polyol | EP-10 |
| S-100 | EB13-97 | Desmolux D100 |
| Phenoxy ethylacrylate | EB-14-22 | Desmolux D200 |
| Urethane acrylate (less than 2000 daltons) | EB14-28 | Desmodur N3200 |
| Acrylic macromere (less than 10,000 daltons) | EB14-29 | Desmodur N100 |
| V2100 | EB14-33 | Desmodur N3300 |
| Cycloaphatic V2100 | EB14-40 | PPO oligomer (less than 5,000 daltons) |
| PAMA | EB14-41 | TMPO |
| Alkoxylated THF acrylate | Urethane Acrylate (more 2,000 daltons) | PEO oligomer (less than 5,000 daltons) |
| Hydroxyethyl acrylate | Acrylate macromer (more than 10,000 daltons) | 2EH oxetane |
| | PPO oligomer (more than 5,000 daltons) | Difunctional oxetane |
| | AS-2549 | Trimethylolpropane triacrylate (TMPTA) |

TABLE 1-continued

Representative Listing of Main Components of Compositions

| Radical Addition Diluents | Bodying Components | Structural Diluents |
|---|---|---|
| | JRL4-128A | Tripropyleneglycol diacrylate (TPGDA) |
| | JRL4-128B | Ethoxylated (3 mol) bisphenol A diacrylate |
| | JRL4-128C | Ethoxylated (3 mol) trimethylolpropane triacrylate |
| | MJZ4-87-1 (EHA-VA-MA-S100) | Bisphenol A digylcidyl ether diacrylate |
| | MW1-65 (EHA-MA-S100) | |
| | MW1-69 (EHA-MA-E1020-S100) | |
| | MW1-91 (EHA-VA-MA) | |
| | MW1-93 (EHA-VA-MA-GMA) – best = MW1-101 | |
| | MW1-94 (Acrylated MW1-93) | |

Details of these various components are provided herein.

Bodying Components

Bodying components are broadly defined herein as having a molecular weight (Mw) of at least 25,000 Daltons. The bodying component(s) may be present in the compositions of the present subject matter in an amount of 10-90 wt %, in certain embodiments 20-80 wt %, and in still other embodiments 30-70 wt %, alternately 5-70 wt %, alternately 40-60 wt %, alternately 30-50 wt %, alternately 5-15 wt %, alternately 10-15 wt %, or 80 wt %. The bodying components may be acrylic based bodying components or non-acrylic based bodying components. Combinations of these and potentially with other components can be used. The bodying components may have molecular weights (Mw) of 5,000 to 1,000,000, in certain embodiments 15,000-250,000, and in still other embodiments 15,000-100,000, alternately 1,000 to 500,000, in certain versions 1,000-100,000, and in still other versions 1,000-50,000, or alternately 18,000-70,000.

In certain embodiments of the present subject matter, particular acrylic based bodying components can be used as follows. It will be understood that the present subject matter includes the use of corresponding methacrylate monomers, oligomers, or components instead of, or in addition to, any of the noted acrylate monomers, oligomers, or components.

MJZ4-87-1: Bodying Component. This bodying component is a random acrylic copolymer with a number average molecular weight (Mn) of 50 k, (polydispersity index (PDI) 3.5, random copolymer) consisting of 55 wt % 2-ethylhexyl acrylate, 25 wt % vinyl acetate, 18 wt % methyl acrylate, and 2 wt % Additol™ S-100.

MW1-65: Bodying Component. This bodying component is a random acrylic copolymer with Mn of 50 k, (PDI 3.5, random copolymer) consisting of 50 wt % 2-ethylhexyl acrylate, 48 wt % methyl acrylate and 2 wt % Additol™ S-100.

MW1-69: Bodying Component. This bodying component is a random acrylic copolymer with Mn of 50 k, (PDI 3.5, random copolymer) consisting of 44.9 wt % 2-ethylhexyl acrylate, 43.1 wt % methyl acrylate 43.1%, 10.2 wt % Elvacite™ 1020 (pMMA) and 1.8 wt % Additol™ S-100.

MW1-91: Bodying Component. This bodying component is a random acrylic copolymer with Mn of 50 k, PDI 3.5, random copolymer, consisting of 56.1 wt % 2-ethylhexyl acrylate, 25.5 wt % vinyl acetate, 18.4 wt % methyl acrylate.

MW1-93 (best example of synthesis is MW1-101). This bodying component is a random acrylic copolymer with Mn of 50 k, PDI 3.5, random copolymer consisting of 55 wt %

2-ethylhexyl acrylate, 25 wt % vinyl acetate, 18 wt % methyl acrylate, 2 wt % glycidyl ethacrylate.

MW1-94: Bodying Component. This bodying component is an adduct of acrylic acid and MW1-93, containing 98 wt % of MW1-93 and 2 wt % glycidyl methacrylate and a chromium (3+) catalyst.

Detailed formulations for certain bodying components presented in Table 1 are set forth in the following Table 2.

TABLE 2

Detailed Formulations of Bodying Components Used In Adhesive Compositions

| Component | Backbone | Monomer 1 | Monomer 2 | Monomer 3 | Monomer 4 | Functionality | Structure | Mw | Mn | PDI |
|---|---|---|---|---|---|---|---|---|---|---|
| AS-2549 | Acrylic | 51% 2EHA | 45% BA | | | 4% acid | random | 380961 | 61545 | 6.19 |
| Kh4-67 | Acrylic | 25% 2EHA | 72% EOEOEA | | | 3% epoxy | P-telechelic | 60441 | 20043 | 3.02 |
| Kh4-46 | Acrylic | 25% 2EHA | 72% EOEOEA | | | 3% alcohol | random | 36747 | 13301 | 2.76 |
| Kh4-105 | Acrylic | 25% 2EHA | 72% EOEOEA | | | 3% alcohol | p-telechelic | n/a | | |
| Kh4-37 | Acrylic | 50% BA | 50% EOEOEA | | | none | random | 54424 | 17337 | 3.14 |
| EB13-84 | Acrylic | 79% BA | 20% tBA | | | 1% alcohol | tadpole | 80987 | 53591 | 1.51 |
| LRK3-33 | Acrylic | 79% BA | 20% tBA | | | 1% alcohol | tadpole | 83000 | 37700 | 2.20 |
| LRK3-44 | Acrylic | 80% BA | 20% tBA | | | 0.4% alcohol | random | 81300 | 42960 | 1.89 |
| PP81-56 | Acrylic | 79% BA | 20% tBA | | | 1% alcohol | tadpole | 71000 | 37400 | 1.90 |
| PP81-67 | Acrylic | 80% BA | 20% tBA | | | 0.4% alcohol | random | 63500 | 35240 | 1.80 |
| KH4-18 | Acrylic | 78% BA | 19% tBA | | | 1.1% alcohol | random | 83726 | 58704 | 1.43 |
| 4240 | PPO | | | | | alcohol | Telechelic | 4000 | | |
| D2000 | PPO | | | | | primary amine | Telechelic | 2000 | | |
| EB14-24 | Acrylate | 48.22% BA | 48.22% tBA | | | 3.56% alcohol | P-telechelic | 54300 | 38100 | 1.43 |
| EB14-15 | Acrylate | 90.1% Butyl Acrylate | | | | 9.1% epoxy | P-telechelic | 129800 | 48500 | 2.68 |
| EB14-16 | Acrylate | 45.05% BA | 45.05% tBA | | | 9.1% epoxy | P-telechelic | 164400 | 48500 | 3.39 |
| EB14-04 | Acrylate | 40% BA | 40% tBA | | | 20% epoxy | random | 44700 | 19700 | 2.27 |
| EB14-02 | Acrylate | 80% BMA | | | | 20% epoxy | random | | n/a | |
| EB14-03 | Acrylate | 80% BA | | | | 20% epoxy | random | | n/a | |
| M112 | carbonate | | | | | alcohol | Telechelic | | | |
| EB13-97 | Acrylate | 80% BA | | | | 20% epoxy | random | 40800 | 12300 | 3.32 |
| EB14-22 | Acrylate | 96.44% BA | | | | 3.56% alcohol | P-telechelic | 60700 | 36000 | 1.69 |
| EB14-28 | Acrylate | 48.22% BA | 48.22% tBA | | | 3.56% alcohol | P-telechelic | 27300 | 18700 | 1.46 |
| EB14-29 | Acrylate | 48.22% BA | 48.22% tBA | | | 3.56% alcohol | telechelic | | n/a | |
| EB14-33 | Acrylate | 90.9% BA | | | | 9.1% epoxy | P-telechelic | | n/a | |
| EB14-40 | Acrylate | 48.22% BA | 48.22% tBA | | | 3.56% alcohol | P-telechelic | | n/a | |
| EB14-41 | Acrylate | 48.56% BA | 48.56% tBA | | | 2.88% alcohol | P-telechelic | | n/a | |
| Urethane Acrylate (Mw > 2000) | Urethane | | | | | | | | | |
| Acrylate macromer (Mw > 10000) | Acrylate | | | | | | | | | |
| PPO oligomer (Mw > 5000) | PPO | | | | | | | | | |
| MJZ4-87-1 | Acrylic | 55% 2-EHA | 25% vinyl acetate | 18% methyl acrylate | 2% S-100 | 2% epoxy | Random | 50000 | 175000 | 3.5 |
| MW1-65 | Acrylic | 50% 2-EHA | 48% methyl | 2% S-100 | | 2% epoxy | Random | 50000 | 175000 | 3.5 |

TABLE 2-continued

Detailed Formulations of Bodying Components Used In Adhesive Compositions

| | | COMPOSITION | | | | | | MOLECULAR WEIGHT | | |
|---|---|---|---|---|---|---|---|---|---|---|
| Component | Backbone | Monomer 1 | Monomer 2 | Monomer 3 | Monomer 4 | Functionality | Structure | Mw | Mn | PDI |
| MW1-69 | Acrylic | 44.9% 2-EHA | 43.1% acrylate methyl acrylate | 10.2% Elvacite 1020 | 1.8% S-100 | 1.8% epoxy | random | 50000 | 175000 | 3.5 |
| MW1-91 | Acrylic | 56.1% 2-EHA | 25.5% vinyl acetate | 18.4% methyl acrylate | none | | random | 50000 | 175000 | 3.5 |
| MW1-93 | Acrylic | 55% 2-EHA | 25% vinyl acetate | 18% methyl acrylate | 2% glycidyl methacrylate | 2% epoxy | Random | 50000 | 175000 | 3.5 |
| MW1-94 | Acrylate | 98% MW1-93 | 2% Acrylic Acid | | | 2% acrylate | random | 50000 | 175000 | 3.5 |

Abbreviations in the preceding Table 2 include BA: butyl acrylate; 2-EHA: 2-ethylhexyl acrylate; tBA: tent-butyl acrylate; EOEOEA: ethoxyethoxyethylacrylate; PPO: polypropylene oxide, BMA: butyl methacrylate.

Radical Addition Diluents

Radical addition diluents are acrylic based monomers having a molecular weight (Mw) of generally less than 25,000 and/or generally having a viscosity below 25,000 cps at 25° C. Radical addition diluents are periodically referred to herein as reactive diluents. Radical addition diluents are present in the compositions of the present subject matter in an amount of 10-80 wt %, in certain embodiments 50-70 wt %, alternately 10-60 wt %, alternately 5-70 wt %, alternately 0-40 wt %, in still other embodiments 30-40 wt %, or alternately 7-25 wt %. Radical addition diluents can include a (meth)acrylate monomer and in certain versions have an overall Mw of less than 10,000 Daltons. Examples of useful radical addition diluents herein include ACE, isostearyl acrylate, heptadecyl acrylate, dicyclopentadiene acrylate, THF acrylate, alkoxylated THF acrylate, hydroxyethyl acrylate, phenoxy ethylacrylate, urethane acrylate (Mw<2000), OXE-10, OXE-30, S-100, V2100, Cycloaliphatic V2100, and PAMA. Many of these components are described in greater detail herein in association with the Examples. Examples of several radical addition diluents are set forth in detail below.

Alkoxylated THF acrylate, is a low viscosity monofunctional monomer available from Sartomer as CD-611, where n is not disclosed, and which is shown below as formula (1):

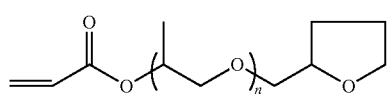

(1)

Hydroxyethyl acrylate: This radical addition diluent is shown below as formula (2):

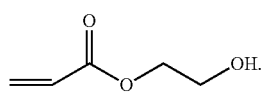

(2)

Phenoxyethylacrylate: This radical addition diluent is shown below as formula (3):

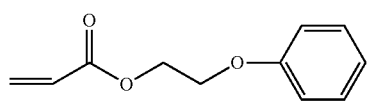

(3)

This low viscosity monofunctional monomer is available from Sartomer as SR339.

Tetrahydrofurfuryl acrylate (THFA or THF acrylate): This radical addition diluent is shown below as formula (4). This low viscosity monofunctional monomer is available from Sartomer as SR285.

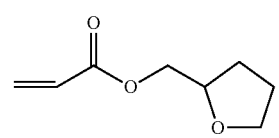

(4)

Structural Diluents

Structural diluents may be present in the compositions of the present subject matter in an amount of 5-80 wt %, alternately 5-50 wt %, in certain embodiments 10-50 wt %, alternately 5-40 wt %, alternately 10-30 wt %, alternately 20-40 wt %, alternately 65-95 wt %, alternately 75-85 wt %, alternately 75-95 wt %, alternately 7-25 wt %, alternately 45-65 wt %, alternately 45-60 wt %, alternately 75-85 wt %, and alternately 15-20 wt %. Structural diluents are periodically referred to herein as structural components. Various structural diluents and details are described in association with the Examples herein.

Various structural diluents include the following: Trimethylolpropane triacrylate (TMPTA). This monomer is available from Sartomer as SR351 and shown below as formula (5):

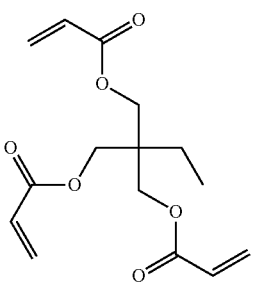

(5)

Tripropyleneglycol diacrylate, available from Sartomer as SR306 and shown below as formula (6):

(6)

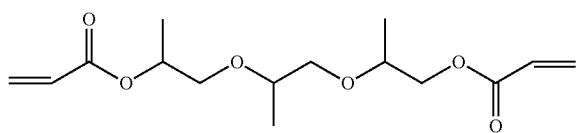

Ethoxylated (3 mol) bisphenol A diacrylate. This monomer is available from Sartomer as SR349 where n+m=3, and is shown below as formula (7):

(7)

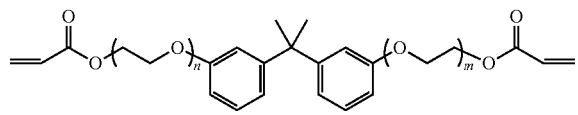

Ethoxylated (3 mol) trimethylolpropane triacrylate, and shown below as formula (8):

(8)

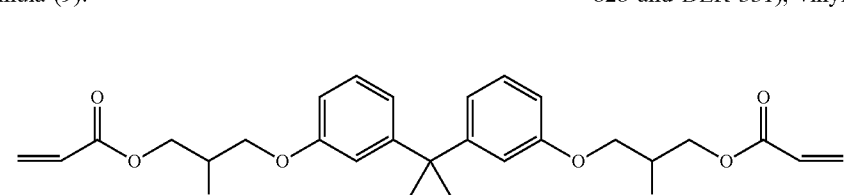

This monomer is available from Sartomer as SR454.

Bisphenol A diglycidyl ether diacrylate is shown below as formula (9):

A-186 and Silquest® A-187. Also useful are epoxies, oxetanes, anhydrides, and lactams.

Cationically polymerizable monomers include epoxy-containing materials, alkyl vinyl ethers, cyclic ethers, styrene, divinyl benzene, vinyl toluene, N-vinyl compounds, 1-alkyl olefins (alpha-olefins), lactams and cyclic acetals.

Epoxy-containing materials that can be cured or polymerized by the catalyst system of this subject matter are those known to undergo cationic polymerization and include 1,2-, 1,3-, and 1,4-cyclic ethers (also designated as 1,2-, 1,3-, and 1,4-epoxides). The 1,2-cyclic ethers are useful in certain versions of the present subject matter.

Cyclic ethers that can be polymerized in accordance with this subject matter include those described in Frisch and Reegan, *Ring-Opening Polymerizations* Vol. 2 (1969). Suitable 1,2-cyclic ethers are the monomeric and polymeric types of epoxides. They can be aliphatic, cycloaliphatic, aromatic, or heterocyclic and will typically have an epoxy equivalence of from 1 to 6, and in certain embodiments 1 to 3. Particularly useful are the aliphatic, cycloaliphatic, and glycidyl ether type 1,2-epoxides such as propylene oxide, epichlorohydrin, styrene oxide, vinylcyclohexene oxide, vinylcyclohexene dioxide, glycidol, butadiene oxide, diglycidyl ether of bisphenol A, cyclohexene oxide, 3,4-epoxy-cyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

A wide variety of commercial epoxy resins are available and listed in Lee and Neville, *Handbook of Epoxy Resins*, (1967) and in P. Bruins, *Epoxy Resin Technology*, (1968). Representative of the 1,3- and 1,4-cyclic ethers which can be polymerized in accordance with this subject matter are oxetane, 3,3-bis(chloromethyl)oxetane, and tetrahydrofuran.

In particular, cyclic ethers which are readily available include propylene oxide, oxetane, epichlorohydrin, tetrahydrofuran, styrene oxide, cyclohexene oxide, vinylcyclohexene oxide, glycidol, octylene oxide, phenyl glycidyl ether, 1,2-butane oxide, diglycidyl ether of bisphenol A (e.g., Epon 828 and DER 331), vinylcyclohexene dioxide (e.g., ERL- (9)

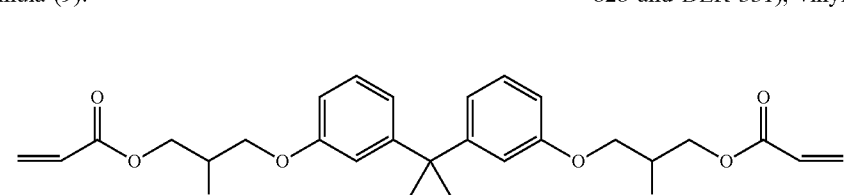

This monomer is available from Cytec as Ebecryl 600.

Radical structural components include one or more curable materials including a homopolymer having a Tg>0° C. Such suitable components include trimethylolpropane triacrylate (TMPTA), ethoxylated (x mol) bisphenol A diacrylate, ethoxylated (x mol) trimethylolpropane triacrylate, and bisphenol A diglycidyl ether diacrylate. The value x is from 1 to 10, in certain embodiments from 1 to 5, and in still other embodiments 3.

Ring opening structural components can also be used in certain embodiments. Suitable ring opening structural components include S-21, S-28, Epon 828, Epon 834, Silquest®

4206), 3,4-epoxycyclohexylmethyl-3,4-epoxycyclohexanecarboxylate (e.g., ERL-4221), 3,4-epoxy-6-methylcyclohexylmethyl-3,4-epoxy-6-methylcyclohexanecarboxylate (e.g. ERL-4201), bis(3,4-epoxy-6-methylcyclohexylmethyl) adipate (e.g., ERL-4299), aliphatic epoxy modified with polypropylene glycol (e.g., ERL-4050 and ERL-4052), dipentene dioxide (e.g., ERL-4269), epoxidized polybutadiene (e.g., Oxiron 2001), silicone epoxy (e.g., Syl-Kem 90), 1,4-butanediol diglycidyl ether (e.g., Araldite RD-2), polyglycidyl ether of phenolformaldehyde novolak (e.g., DER-431), Epi-Rez 521 and DER-438), resorcinol diglycidyl ether (e.g., Kopoxite), polyglycol diepoxide (e.g., DER-736), polyacrylate epoxide (e.g., Epocryl U-14), urethane modified epoxide (e.g., QX3599), polyfunctional flexible epoxides (e.g., Flexibilizer 151), and mixtures thereof as well as mixtures thereof with co-curatives, curing agents or hardeners which also are known (see Lee and Neville and Bruins, supra). Representative of the co-curatives of hardeners that can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

Cationically-polymerizable monomers useful in the present subject matter include but are not limited to epoxy-containing materials, alkyl vinyl ethers, cyclic ethers, styrene, divinyl benzene, vinyl toluene, N-vinyl compounds, cyanate esters, 1-alkenes (alpha olefins), lactams and cyclic acetals.

Additional cationically-polymerizable monomers are described in U.S. Pat. No. 5,252,694 at col. 4, line 30 through col. 5, line 34. Particular monomers of this class include EPON® 828, and EPON® 1001F and the ERL series of cycloaliphatic epoxy monomers such as ERL-4221® or ERL-4206®. Particularly useful monomers are the ERL series because of their lower cure temperatures.

Certain lactones may be useful in the present subject matter. The lactones which can used as comonomers in the present subject matter include those shown below with formulas (10)-(12):

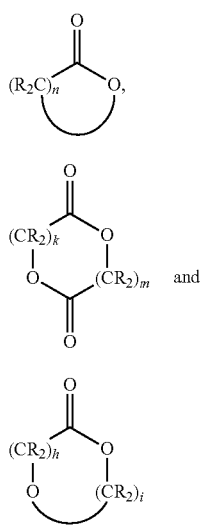

wherein n is 4 or 5, h, i, k, and m are independently 1 or 2 and each R is independently chosen from H or hydrocarbyl containing up to 12 carbon atoms. Particular lactones are those in which R is hydrogen or methyl, and in certain embodiments particularly useful lactones are e-caprolactone, d-valerolactone, glycolide (1,4-dioxan-2,5-dione), 1,5-dioxepan-2-one and 1,4-dioxan-2-one.

An additional class of diluent that may be employed in the present subject matter is a ring-opening monomer diluent. Such a diluent is also non-reactive with the other reactants under conditions of free radical polymerization employed and which is capable of undergoing ring opening subsequent to formation of the acrylate polymer during the curing step. Such ring-opening diluents comprise, without limitation, lactones, lactams, cyclic ethers and cyclic siloxanes represented by the following general formulas shown below as (13)-(16):

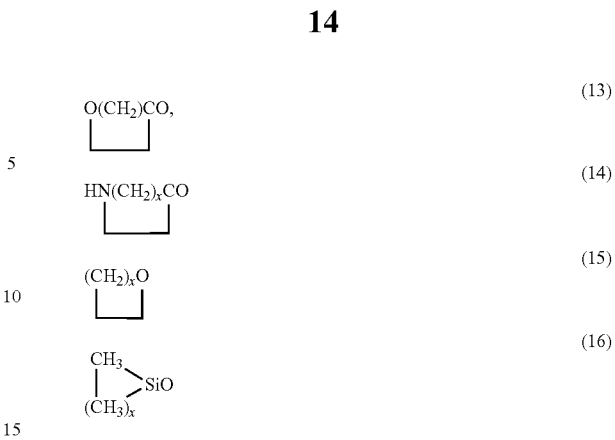

In formulas (13)-(16), x ranges from, for example, 3 to 11, and in certain versions 3-6 alkylene groups.

U.S. Pat. No. 5,082,922 describes the use of ring-opening monomers as diluents in the solvent-free formation of polymers from ethylenically unsaturated monomers. However, this patent describes a single step reaction of the monomers together with the ring-opened diluent. This differs from the two step strategy of certain methods of the present subject matter which provide for the initial formation of the polymer from ethylenically unsaturated monomers followed by curing of the diluent in the presence of the thus-formed polymer. The noted patent provides for use of reaction conditions such as temperatures of at least 150° C. which support both reactions in a single step.

Useful ring-opening monomer diluents include but are not limited to butyrolactone, valerolactone, caprolactone, methy-butyrolactone, butyrolactam, valerolactam, caprolactam and siloxanes.

A siloxane ring opening monomer is Siloquest® A-186, which acts as a ring opening cured structural component as well as a silane functional structural component through silane-silane condensation reaction. Siloquest® A-186 (beta (3,4-epoxycyclohexyl) ethyltrimethoxysilane) has the following formula (17):

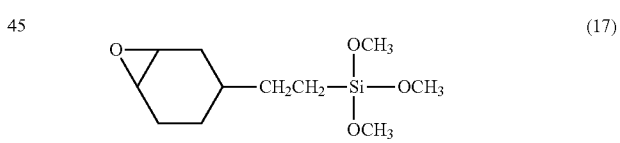

Beta-(3,4-Epoxycyclohexyl)ethyltrimethoxysilane

While the polymerization reaction may be carried out in the presence of a non-reactive solvent, the reaction can advantageously occur in the substantial absence of a solvent. In certain embodiments, the solvent will be present in an amount of up to about 10 percent by weight, and preferably no more than 5 percent by weight, based on the total weight of the reactants. The solvent may be removed from the product of the diluent reaction step (such as by heating). Exemplary non-reactive solvents include ketones, alcohols, esters and hydrocarbon solvents, such as ethyl acetate, toluene and xylene.

Oxazolines, or oxazolidines, useful in the present subject matter include those having the following formulas (18)-(19):

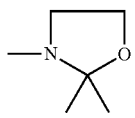

(18)

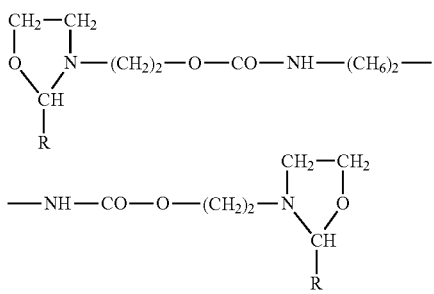

(19)

(20)

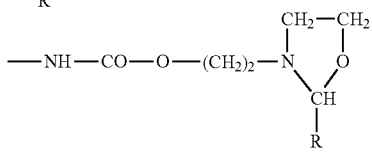

where R represents a branched, saturated, aliphatic hydrocarbon radical containing 5 to 8 carbons. Another suitable oxazoline is shown below as (20):

where R represents a branched, saturated, aliphatic hydrocarbon radical containing 5 to 8 carbons.

The oxazolidine mixtures useful herein generally have a viscosity of less than 8,000, and in certain versions, less than 6,500 mPa·s at 23° C. and, thus, are suitable as solventless hardeners for polymer precursors containing isocyanate groups. In combination with polymer precursors containing isocyanate groups, they are suitable for the production of solventless or low solvent, one-component systems which, in turn, are suitable as binders for high quality paints, coating compositions or sealing compositions. These systems are generally cured after application by exposure to atmospheric moisture. Polymer precursors containing isocyanate groups which are suitable for the production of these systems include the organic polyisocyanates or isocyanate prepolymers described, e.g., U.S. Pat. No. 4,002,601. Generally the oxazolines useful herein are described in U.S. Pat. No. 5,189,176.

In certain embodiments, bismaleimides can be used. The bismaleimides that may be used in the present subject matter are organic compounds containing two maleimide groups and are prepared generally from maleic anhydride and diamines. Bismaleimides may be described by the general formula of (21) as follows:

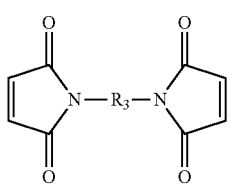

(21)

wherein $R^3$ is a divalent aromatic or alicyclic organic group. In certain versions, useful bismaleimides are derived from aromatic diamines and particularly are those wherein $R^3$ is a polynuclear aromatic radical. Examples of such bismaleimides include 2,2-bis(4-aminophenoxy-4-phenyl) propane bismaleimide, 4,4'-bis(3-amino phenoxy) diphenyl sulfone bismaleimide, 1,4-bis(3-aminophenyl isopropylidene) benzene bismaleimide and bis(4-aminophenyl) methane bismaleimide. The bismaleimides may be used singly or as mixtures.

It is also possible to use bismaleimides in which up to 50% of the maleimide groups have been replaced by substituted maleimide groups such as methyl maleimides or halomaleimides or by the nadimide, methyl nadimide, or isomaleimide groups. Portions of the maleimide groups may also be replaced by succinimide, phthalimide, or substituted succinimide and phthalimide groups.

The bismaleimide may be prepared by a number of well known methods from maleic anhydride and diamines, and a great many are readily available from commercial sources.

As previously noted, in certain aspects of the present subject matter, one or more components of the compositions such as the bodying components can be non-acrylic based bodying components. A wide array of non-acrylic based components can be used. Nonlimiting examples include polyolefins, polyvinyl aromatics, polyurethanes, polycarbonates, polyesters, polyethers, and combinations of these and potentially with one or more other agents and/or components. A particular nonlimiting example of a polyvinyl aromatic is polystyrene.

Additives

Various additives and initiators are useful with the adhesives and compositions of the present subject matter. Periodically, the term "curative" is used herein. That term refers to an agent(s) or stimulus that promotes or causes polymerization of the polymer(s) in the subject composition. Thus, the term curative includes a single agent, a single stimulus, multiple agents, multiple stimuli, combinations of agents, combinations of stimuli, and combinations of one or more agents with one or more stimuli. Generally, the curative(s) is activable, i.e., activatable, by at least one of radiation, heat, moisture, pressure, ultrasound, exposure to chemical agents, and combinations thereof. Typically, the term curative as used herein refers to catalysts and/or photoinitiators. However, it will be appreciated that the term may include a wide array of other agents (and stimuli).

Thermal Catalysts. The catalysts herein may be external or internal. Catalysts may be used in an amount of 0-10 wt %, 0.1-10 wt %, 0-5 wt %, 0.1-5 wt %, 0-4 wt %, 0.1-4 wt %, 0-2 wt %, 0.1-2 wt %, or 0.01-2 wt %. Suitable catalysts include blocked strong acid catalysts, which are based on acids consisting of, for example trifluoromethanesulfonic acid (triflic acid), dinonylnaphthalene sulfonic acid (DSA), dinonylnaphthalene disulfonic acid (DDSA), hexafluoro phosphate, and ammonium antimony hexafluoride (a Lewis acid), and are available from King Industries for example as K-Pure® CXC 1615 (diethylamine salt of trifluoromethanesulfonic acid), Nacure® 155 (a blocked acid catalyst based on DNNDSA), K-Pure® CXC 1612 (ammonium antimony hexafluoride), Nacure® Super-A218 (zinc salt of trifluoromethanesulfonic acid), K-Pure® CXC 1738 (ammonium hexafluorophosphate), and K-Pure® CXC 1614 (ammonium trifluoromethanesulfonic acid).

Base catalysts can be primary, secondary or tertiary amines. A suitable primary diamine is diamino diphenyl sulfone. Other bases include imidizoles and ketimines. Suitable imidizoles include 2-methyl imidizole, 2-ethyl 4-methyl imidizole, 2-phenyl imidizole. A listing of imidizole curatives are found in US Patent Application Publication No. 2009/0194320, paragraph [0045]. A latent base curative is dicyandiamide [DICY].

Photoinitiators. Photoinitiators include radical photoinitiators and UV radical photoinitiators. Photoinitiators may be present in the compositions of the present subject matter in amounts of 0-10 wt %, 0.01-10 wt %, 2-5 wt %, or 1-3 wt %.

Radical Photoinitiators. Thermal initiators include t-butyl peroxy 2-ethylhexanoate, t-butyl peroxy pivalate, t-amylperoxy-2-ethyl hexanoate, Benzoyl Peroxide, t-amyl peroxybenzoate, t-butyl peroxy acetate, and Azo compounds sold under the trade name Vazo, such as for example Vazo 52, Vazo 67, and Vazo 88.

UV Radical Photoinitiators. The photoinitiators which are suitable in the present subject matter include both type I and type II photoinitiators.

Type I photoinitiators are defined to essentially undergo a unimolecular bond cleavage reaction upon irradiation thereby yielding free radicals. Suitable type I photoinitiators are selected from a group consisting of benzoin ethers, benzil ketals, alpha-dialkoxy-acetophenones, α-hydroxyalkylphenones and acyl-phosphine oxides. Suitable type I photoinitiators are commercially available, for example, as Esacure KIP 100 from Lamberti Spa, Gallarate, Italy, or as Irgacure 651 from Ciba-Geigy, Lautertal, Germany.

In general, the type I photoinitiator compounds suitable herein are selected from a group consisting of benzoin ethers, benzil ketals, α-dialkoxy-acetophenones, α-hydroxyalkylphenones and acyl-phosphine oxides.

Type II photoinitiators are defined to essentially undergo a bimolecular reaction where the photoinitiators interact in an excited state with a second compound acting as co-initiator, to generate free radicals. Suitable type II photoinitiators are selected from a group comprising benzophenones, thioxanthones and titanocenes. Suitable co-initiators are preferably selected from a group consisting of amine functional monomers, oligomers or polymers whereby amino functional monomers and oligomers are used in certain embodiments. Both primary, secondary and tertiary amines can be used whereby tertiary amines are used in certain embodiments. Suitable type II photoinitiators are commercially available, for example, as Esacure TZT from Lamberti Spa, Gallarate, Italy, or as 2- or 3-methylbenzophenone from Aldrich Co., Milwaukee, Wis., USA. Suitable amine co-initiators are commercially available, for example, as GENOMER® 5275 from Rahn AG, Zurich, Switzerland.

Specific examples of type II photoinitiator compounds include benzophenones and thioxanthones. In a particular embodiment, co-initiator compounds such as amines may be present and may interact with the type II photoinitiator compounds.

Crosslinkers. The crosslinkers useful herein include radiation activatable crosslinking agents, which are selected from the group consisting of aldehydes, ketones, quinones, thioxanthones, and s-triazines. Metal chelate crosslinker catalysts are also envisioned. The crosslinkers may be present in the compositions of the present subject matter in an amount of 2 to 95 wt %, 0-4 wt %, 0.01-4 wt %, 0.01-2 wt %, 0-2 wt %, 0.01-1 wt %, 0-1 wt %, 0.01-0.5 wt %, or 0-0.5 wt %.

Photosensitizers. Each sensitizer tends to have its own characteristic response in the visible and ultraviolet light spectrum, so they may be used in combination to broaden the light response and/or increase the speed of response to exposure to light.

Photosensitizers may be used in the compositions of the subject matter in amounts such as 0-15 wt %, 0-01-15 wt %, 0-10 wt %, 0.01-10 wt %, 0-5 wt %, 0.01-5 wt %, 0-2 wt %, 0.01-2 wt %, 0-1 wt, and 0.01-1 wt %. Photosensitizers may be sensitizing dyes.

Illustrative sensitizing dyes are those in the following categories: diphenylmethane, xanthene, acridine, methine and polymethine, thiazole, thiazine, azine, aminoketone, porphyrin, colored aromatic polycyclic hydrocarbons, thioxanthenones p-substituted aminostyryl compounds and aminotriaryl methanes.

Stabilizers and Processing Aids. Several categories of stabilizers and processing aids are envisioned, including oils/waxes, antioxidants, photosensitizers, rheology modifiers, fillers, radical structural components, ring opening structural components, epoxies, oxetanes, anhydrides, lactams, lactones, oxazolines, isocyanates, bismaleimides, and azodioxides. Stabilizers and process aids are used in the compositions of the subject matter in amounts such as 0-10 wt %, 0.1-10 wt %, 0-4 wt %, 0.1-4 wt %, 0-3 wt % and 0.1-3 wt %. In certain embodiments, it may be useful to utilize an azodioxide as a stabilizer. An example of such is the stabilizer commercially available from Hampford Research, Inc. of Stratford, Conn., under the designation UVTS-52. UVTS-52 is a thermally reversible azodioxide. UVTS-52 (CAS 34122-40-2) is believed to be 1,4,4-trimethyl-2,3-diazabicyclo-[3.2.2]-non-2-ene-2,3-dioxide.

Plasticizers—Oils and waxes. Suitable plasticizers include plasticizing oils, such as mineral oil, but also olefin oligomers and low molecular weight polymers, or glycol benzoates, as well as vegetable and animal oil and derivatives of such oils. The petroleum-derived oils that may be employed are relatively high boiling temperature materials containing only a minor proportion of aromatic hydrocarbons. In this regard, the aromatic hydrocarbons should in certain embodiments be less than 30%, and more particularly less than 15%, by weight, of the oil. Alternately, the oil may be fully non-aromatic. Suitable oligomers included as plasticizers may be polypropylenes, polybutenes, hydrogenated polyisoprene, hydrogenated butadiene, or the like having average molecular weights between about 100 and about 10,000 g/mol. Suitable vegetable and animal oils include glycerol esters of the usual fatty acids (for example, stearic, oleic, linoleic, linolenic) and polymerization products thereof. Other plasticizers may be used provided they have suitable compatibility. Nyflex® 222B, a naphthenic mineral oil manufactured by Nynas Corporation, has also been found to be an appropriate plasticizer. As will be appreciated, plasticizers have typically been employed to reduce the viscosity of the overall adhesive composition without substantially decreasing the adhesive strength and/or the service temperature of the adhesive. The choice of plasticizer can be useful in formulation for specific end uses (such as wet strength core applications). Because of economics involved in production and in material cost, as plasticizers are usually of lower cost than other materials involved in the formulation like polymers and tackifying resins, the amount of plasticizer in the adhesive should be maximized for cost considerations.

Waxes in amounts of 0% to 20% by weight or 0.1-20 wt %, or 0.1-15 wt %, can also be used in the adhesive compositions, and are used to reduce the melt viscosity of the adhesives without appreciably decreasing their adhesive bonding characteristics. These waxes also are used to reduce the open time of the composition without affecting the temperature performance.

Examples of useful wax materials include the following.

Low molecular weight (100-6000 g/mol) polyethylene having a hardness value, as determined by ASTM method D-1321, of from about 0.1 to 120 and ASTM softening points of from about 66° C. to 120° C. can possibly be used.

Petroleum waxes such as paraffin wax having a melting point of from about 130° F. to 170° F. and microcrystalline wax having a melting point of from about 135° F. to 200° F., the latter melting points being determined by ASTM method D 127-60 can possibly be used.

Atactic polypropylene having a Ring and Ball softening point of from about 120° to 160° C. can potentially be used.

Metallocene catalyzed propylene-based wax under the name "Licocene" commercialized by Clariant International, Ltd., Muttenz, Switzerland, can possibly be used.

Metallocene catalyzed wax or single-site catalyzed wax like for example those described in U.S. Pat. Nos. 4,914,253 and 6,319,979, and WO 97/33921 and WO 98/03603 can potentially be used.

Paraffin waxes, microcrystalline waxes, polyethylene waxes, polypropylene waxes, by-product polyethylene waxes, synthetic waxes made by polymerizing carbon monoxide and hydrogen such as Fischer-Tropsch waxes, oxidized Fischer-Tropsch waxes, functionalized waxes, and mixtures thereof, can possibly be used.

Polyolefin waxes. As used herein, the term "polyolefin wax" refers to those polymeric or long-chain entities comprised of olefinic monomer units. These materials are commercially available from Westlake Chemical Co. under the trade name "Epolene."

The materials which are used in certain embodiments of the present subject matter have a Ring and Ball softening point of 200° F. to 350° F. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes."

Antioxidants. The adhesive also typically includes about 0.1% to about 5% of a stabilizer or antioxidant. The stabilizers which are useful in the adhesive compositions of the present subject matter are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. In certain embodiments, a particularly useful antioxidant is Irganox 1010, a tetrakis(methylene(3,5-di-teri-butyl-4-hydroxyhydrocinnamate))methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity. This steric hindrance thus provides the phenolic compound with its stabilizing properties. Representative hindered phenols include:

1,3,5-trimemyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

Ultraviolet Inhibitors. Antioxidants may be used to retard the oxidative attack on the adhesive composition, which can result in loss of the adhesive and cohesive strength of adhesive composition. Useful antioxidants include but are not limited to amines, such as N—N'-di-beta-naphthyl-1,4-phenylenediamine, available as AGERITE D, phenolics, such as 2,5-di-(t-amyl) hydroquinone, available as SANTOVAR A, from Monsanto Chemical Co., tetrakis[ethylene 3-(3',5'-di-tert-butyl-4'-hydroxyphenyl)propianate]methane, available as IRGANOX 1010 from Ciba-Geigy Corp., and 2-2'-methylenebis(4-methyl-6-tert butyl phenol), available as ANTIOXIDANT 2246, and dithiocarbamates, such as zinc dithiodibutyl carbamate.

Rheology Modifiers. Rheology modifiers can be added to change the thixotropic properties of the composition. Suitable rheology modifiers include polyamide waxes, fumed silica, flow control additives, reactive diluents, anti-settling agents, alpha-olefins, hydroxyl-terminated silicone-organic copolymers, including but not limited to hydroxyl-terminated polypropyleneoxide-dimethylsiloxane copolymers, and combinations thereof.

Fillers. Fillers can be used to impart strength or reduce overall cost. Useful fillers herein include aluminum trihydroxide, calcium hydroxide, expandable microspheres sold under the trade name Expancel®, carbon black, titanium dioxide or nickel coated glass spheres.

In certain versions of the present subject matter, a filler, rheology modifier and/or pigment is present in the adhesive. These can perform several functions, such as modifying the rheology of the adhesive in a desirable way, absorbing moisture or oils from the adhesive or from a substrate to which it is applied, and/or promoting cohesive, rather than adhesive, failure. Other examples of such materials include calcium carbonate, calcium oxide, talc, coal tar, textile fibers, glass particles or fibers, aramid pulp, boron fibers, carbon fibers, mineral silicates, mica, powdered quartz, bentonite, wollastonite, kaolin, fumed silica, silica aerogel or metal powders such as aluminum powder or iron powder. Among these, calcium carbonate, talc, calcium oxide, fumed silica and wollastonite are particularly useful, either singly or in some combination, as these often promote the desired cohesive failure mode.

In addition to the various particular compositions described herein, the present subject matter also provides several additional specific compositions as set forth below. It will be appreciated that these are representative, non-limiting examples of other particular compositions of the present subject matter.

An additional embodiment of the present subject matter includes a cure in place pressure sensitive adhesive comprising: (a) 50-80 wt % of an acrylic base polymer having a Mw of 250,000-750,000, (b) 20-40 wt % of one or more structural diluents, (c) 0-30 wt % of an optional acrylic-epoxy functional component, (d) 0-0.5 wt % of a metal chelate crosslinker, and (e) 0-2 wt % of one or more external catalysts.

Another embodiment of the present subject matter is a curable pressure sensitive adhesive formed from a blend, wherein the blend comprises (a) a high-molecular weight (for example 400-600 k g/mol) random copolymer including (i) an alkyl acrylate base monomer; (ii) vinyl acetate; (iii) methyl acrylate; (iv) acrylic acid; and (v) a silane crosslinking monomer; (b) a low molecular weight (for example 20-50 k g/mol) random copolymer including (i) a linear alkyl acrylate base monomer, (ii) a branched alkyl acrylate base monomer and (iii) an epoxy functional methacrylate monomer; (c) an oligomer such as STPE-30 from Wacker; (d) an acrylate-glycidyl ester of a 10-carbon carboxylic acid; (e) a cationic reactive diluent such as trimethylolpropane oxetane (TMPO); (f) high molecular weight acid functional acrylic diluent monomer, (example of which is 2-acryloyloxypropyl phthalate); (g) bisphenol-A based epoxy resin that is semi-solid at room temperature; and (h) a crosslinker and silane catalyst such as aluminum acetylacetonate.

Figure 2:
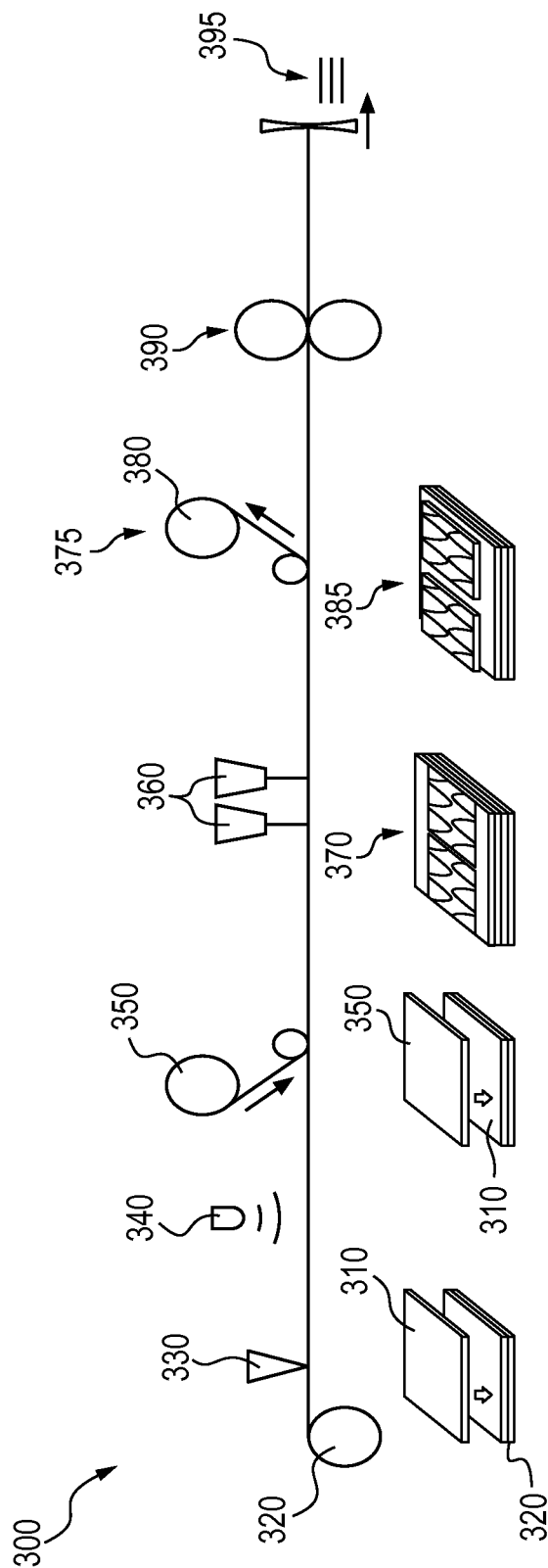
FIG. 2 depicts a generalized adhesive bonding process of the present subject matter.

The present subject matter also provides methods and techniques for bonding using the liquids and compositions described herein. FIG. 2 schematically depicts an adhesive bonding process 300 according to the present subject matter. In process 300, a layer or coating 310 of composition as described herein is applied to a substrate or film of interest 320. The composition can be applied in a wide variety of techniques such as by spraying or coating, generally depicted at operation 330. The coated or otherwise applied composition is then rendered tacky by exposure to UV radiation for example, shown as 340 in FIG. 2. At this state, the composition is typically referred to as "A-stage" and in certain embodiments may exhibit a T-peel value of 0.17 lbs. and a 180° peel of 0.64 lbs. Another material layer such as a laminate of copper and aluminum foil shown as 350 is then contacted with the tacky A-stage composition 310. The resulting layered assembly is directed to one or more processing stations such as a laser patterning station 360 which forms a patterned laminate depicted as 370 in FIG. 2. Depending upon the end use requirements, additional processing such as removal of a strip foil matrix can be performed such as at operation 375 at which a waste matrix 380 is collected. The resulting processed laminate is shown as 385. The processed laminate 385 may then be subjected to one or more additional processing operations such as a thermal cure, shown as 390. After thermal curing, the composition 310 referred to as "B-stage" typically exhibits significantly greater T-peel and 180° peel values as compared to those of its A-stage. For example, B-stage T-peel values can be about 0.37 lbs. and 180° peel values can be about 3.6 lbs. The cured product can be collected in roll form or sheet form, 395.

Generally, in various embodiments of the present subject matter the liquids or compositions described herein can be rendered tacky or exhibit properties typically associated with pressure sensitive adhesives upon at least partially curing the composition by any of the agents or stimuli as described herein. In certain versions, this first cure or partial cure is achieved by exposing the composition to UV radiation, electron beam, heat, or combinations of these. Furthermore, the partially cured composition can then be further cured by exposure to heat, chemical agents including water or moisture, pressure, or combinations thereof.

The present subject matter compositions can be used in a wide array of applications. For example, an application of particular use could involve foamed articles made from the compositions described herein. One or more conventional blowing agents could be incorporated in the compositions of the present subject matter, blowing or expansion effected, to thereby produce a foamed layer or article. The compositions could also be used to adhesively bond foamed articles to other surfaces, substrates, or items.

More specifically, the present subject matter can be used for bonding or otherwise adhering film to film, film to foil, aprons to foil, aprons to film, fabric to fabric, fabric to nearly any other material or substrate such as films, papers, and metals, paper to metal, metal to metal, films to other plastics, plastics to plastics, and combinations of these with other surfaces, materials, and/or substrates. The present subject matter can also be used to provide chemical resistance, e.g., corrosion resistance, to a variety of surfaces and substrates. For example, the subject matter can be used to provide chemically resistant labels, and solvent resistant laminates such as solvent resistant glass and foil assemblies. The present subject matter can also be utilized to form film laminates such as film to film laminates. Another contemplated application of the present subject matter is in the field of shrink sleeves and shrink sleeve labels. Furthermore, the present subject matter may find wide applications for solvent welding of two films. Yet another field of application relates to corrosion protection of components and particularly metal pipes such as oil and gas pipelines. The present subject matter compositions and methods can be used to provide or increase impact resistance, structural integrity, and protection against corrosion or exposure to environmental agents. A particular and nonlimiting example of such corrosion protection is providing an outer layer, an inner layer, or both along outer and/or inner circumferential surfaces of pipes. Another significant benefit of certain compositions in accordance with the present subject matter is that the compositions can be subjected to bending, flexing, or other stresses without cracking. This is desirable if for example the composition(s) is applied to piping. Yet another contemplated application for certain compositions of the present subject matter is in forming fiberglass structures such as marine boat hulls, certain sporting goods, and structural members. Still another application for the present subject matter is in "roll on, shrink on" (ROSO) applications.

EXAMPLES

Examples 1-4

The cure in place adhesives of certain embodiments of the present subject matter can be described as an acrylic polymer admixed with reactive diluents, oligomers, and structural components. Additional details of the present subject matter are provided in the following examples.

Example 1: High Performance PSA with Moisture Curable Oligomer (Cure in Place Adhesive)

Example 1 is an acrylic polymer with a latent reactive oligomer (STPE-30). The STPE-30 oligomer cures by a silane-silane condensation reaction. Optionally, the base polymer as well may have silane functionality and can co-react with the reactive oligomer.

Example 2: High Performance PSA with UV Curable Oligomer (Cure in Place Adhesive)

Example 2 is an acrylic polymer admixed with reactive diluents and structural components triggered by UV exposure to transform the adhesive from liquid to a solid PSA, and cured to full strength by heating during film to film lamination.

In order to incorporate an in-situ moisture cure into a high performance pressure sensitive adhesive system, an acrylic polymer, tackifer, and reactive oligomer are admixed in solvent. This system is coated into tape form under conditions which leaves a portion of the oligomer latent to react after application and exposure to humidity as described herein.

Example 3: High Performance PSA with Moisture Curable Oligomer (Cure in Place Adhesive, Solid Components)

The composition of Example 3 is a high performance PSA with moisture curable oligomer (Cure In Place Adhesive). In order to incorporate the in-situ moisture cure into a high performance pressure sensitive adhesive system, an acrylic polymer, tackifer, and reactive oligomer are admixed or otherwise combined in solvent. This system is coated into tape form under conditions which leaves a portion of the oligomer latent to react after application and exposure to humidity.

TABLE 3

Formulation of Example 3 PSA

| Weight Percent | Component |
|---|---|
| 54.45% | DEV-8631U (acrylic base polymer) |
| 25% | Terpene phenolic tackifier (softening point 110-120° C.) |
| 20% | Terpene phenolic tackifier (softening point 110-120° C.) |
| 0.55% | Metal chelate aluminum acetyl acetonate (crosslinker &catalyst) |

The acrylic base polymer is a high molecular weight (400-600 k g/mol) random copolymer including (a) an alkyl acrylate base monomer; (b) vinyl acetate; (c) methyl acrylate; (d) acrylic acid; and (e) a silane crosslinking monomer.

An example of the acrylic base polymer is DEV8631U, which is a random copolymer having a molecular weight (Mw) of about 518,000 g/mol, which includes the following constituents.

TABLE 4

Acrylic Base Polymer (i.e., DEV8631U) in Example 3 PSA

| Component | Weight Percent |
|---|---|
| 2-Ethylhexyl acrylate (base monomer) | 57.95 |
| Vinyl acetate (modifying monomer) | 25 |
| Methyl acrylate | 15 |
| Acrylic acid (high Tg monomer, crosslinking site) | 3 |
| methacroyloxypropyltrimetoxy silane (crosslinking monomer) | 0.05 |

The reactive oligomer is a silane-terminated polyether (an oligomer) such as STPE-30 from Wacker as shown below as formula (22). STPE-30 is a silane terminated polyether. The two silane-terminated polypropylene glycols shown are based on the same polyether. The difference is in the end group.

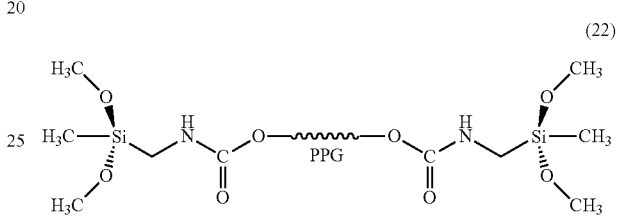

(22)

The crosslinker and catalyst is aluminum acetylacetonate and is shown below as formula (23):

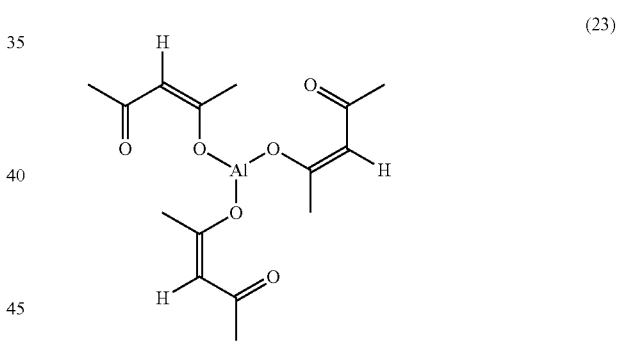

(23)

Figure 6:
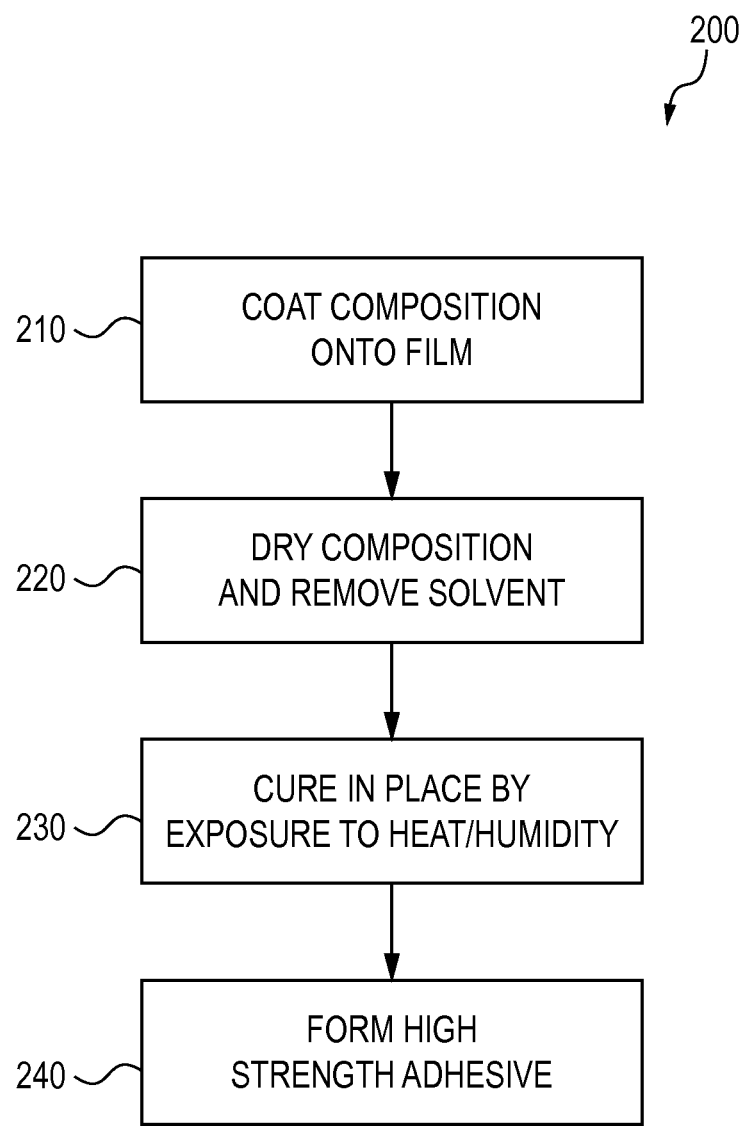
FIG. 6 is a schematic flowchart depicting an adhesive bonding process in accordance with the present subject matter.

The adhesive bonding process is depicted in FIG. 6. Referring to FIG. 6, generally, a bonding process 200 in accordance with the present subject matter is as follows. In operation 210, a composition as described herein is coated or otherwise applied onto a film or substrate. An example of such a film is a release film. After appropriate application, the composition is dried which typically also includes removal of at least a portion of any solvent in the composition, as depicted as operation 220. Representative conditions for drying include exposure to 80° C. for about 5 minutes. In operation 230, the composition is then cured in place by exposure to heat and/or humidity, to thereby form a high strength adhesive, 240. The condensation reaction taking place is shown below:

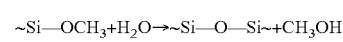

FIG. 1 depicts a dynamic mechanical analysis of the cure in place pressure sensitive adhesive of Example 3.

Example 4: Liquid Composition Curable to PSA (UV) and B-Staged During Film to Film Lamination (Cure in Place Adhesive)

In Example 4, an acrylic polymer is admixed with reactive addition diluents and structural diluents.

TABLE 5

Formulation of Example 4 Liquid Composition

| Weight Percent | Component |
|---|---|
| 15% | ACE monomer stage components (reactive diluent) |
| 10% | V2100 (reactive diluent) |
| 10% | Epon 834 (structural component) |
| 9% | TMPO Oxetane (structural component) |
| 56% | EB14-04 (acrylic polymer) |

An example of the reactive diluent is ACE monomer ACE™ hydroxyl acrylate monomer, provided by Momentive Performance Materials, Leverkusen Germany, which is the reaction product of acrylic acid with Cardura™ Cardura is the glycidyl ester of Versatic™ Acid 10, a highly branched saturated carboxylic acid containing 10 carbon atoms. ACE has a unique structure combining a bulky hydrophobic tail, a pendant hydroxyl group and an acrylate functionality, with a molecular weight about 300. ACE has the structure shown below as formula (24):

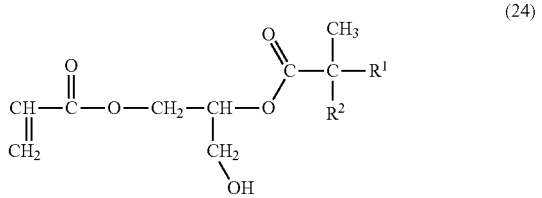

(24)

Another reactant diluent, a high molecular weight acid functional acrylic diluent monomer, V-2100, which is 2-acryloyloxypropyl phthalate, available from San Esters Corporation, New York, N.Y., is shown as formula (25) as follows:

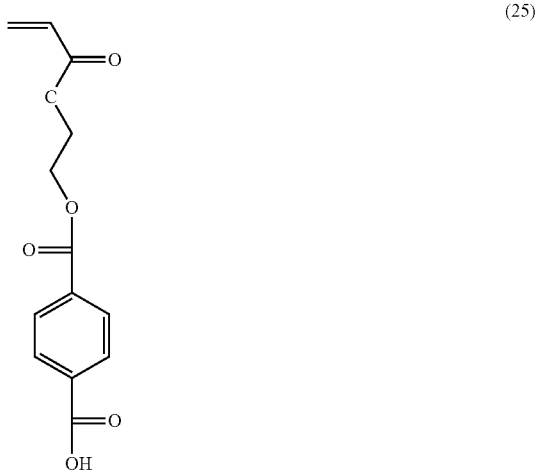 [SMILES: C=CC(=O)CCCOC(=O)c1ccc(C(=O)O)cc1]

(25)

A structural component is EPON™ Resin 834, which is a BPA based epoxy resin that is semi-solid at room temperature, available from Momentive Performance Materials. Systems using EPON Resin 834 can be formulated to be useful in a variety of high solids and tar modified coatings, high toughness adhesives, laminating, and prepreg molding materials. Because of its higher molecular weight, EPON Resin 834 provides enhanced system reactivity, surface tack and cured resin toughness in comparison to liquid grade BPA epoxies, but reduces elevated temperature performance. EPON Resin 834 is especially useful in applications requiring extra surface tack, cure speed or toughness.

Another structural component is a cationic reactive diluent such as trimethylolpropane oxetane (TMPO). A UV/EB cationic formulation can be formed and which includes mostly resins, diluents, and photoinitiators such as 3, 4, epoxy cyclohexyl methyl-3,4 epoxy cyclohexane carboxylate (shown as formula (26) below) as the main resin and TMPO as the reactive diluent:

(26)

An acrylic component is a low molecular weight (20-50 k g/mol) random copolymer including (a) a linear alkyl acrylate base monomer, (b) a branched alkyl acrylate base monomer and (c) an epoxy functional methacrylate monomer.

An example of the acrylic component is the following, which is a low molecular weight polymer, EB14-04, which is a random copolymer having a Mw of about 40,000 g/mol:

TABLE 6

Example of Acrylic Component, i.e., EB14-04 in Example 4 Liquid Composition

| Component | Weight percent |
|---|---|
| Butyl Acrylate (Base Monomer) | 40 |
| t-Butyl Acrylate | 40 |
| S-100 (cycloaliphatic epoxy functional methacrylate monomer) | 30 |

The adhesive bonding process is depicted in FIG. 6.

Examples 5-7

Examples 5-7 illustrate polymerization processes that can be used to form components and compositions of the present subject matter.

Example 5: Polymerization of Components with Pseudo Telechelic, Example Having Epoxy Functionality Using SFRP Agent An acrylic copolymer with reactive functionality positioned in the segments adjacent to the polymer chain end, shown below as formula (27):

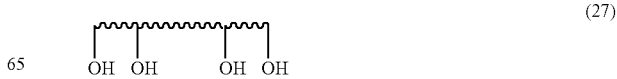

(27)

is prepared as follows. Into a 1500 ml reactor equipped with a heating jacket, agitator, reflux condenser, feed tanks and nitrogen gas inlet there is charged 8.30 g of Blocbuilder from Arkema Inc. Monomers and solvent are added to a feed vessel in the following amounts:

22.30 g of 2-ethyl hexyl acrylate;
64.30 g of ethoxy ethoxy ethyl acrylate; and
85.30 g of propyl acetate The Blocbuilder in the reactor and the monomers and solvent in the feed vessel are sparged with a constant nitrogen purge for 30 minutes at room temperature. After the hold, the monomer and solvent mix is fed to the reactor to generate a small portion of the non-reactive segment adjacent from reactive polymer mode in order to add acrylate groups to the Blocbuilder. The reactor charge mixture then is heated to greater than 70° C. (reactor jacket 75° C.) and held for 30 min. After the second hold, the reactor charge mixture is cooled to room temperature (approximately 25° C.). Once the reactor charge reaches room temperature, 13.40 g of Synasia Epoxy S-100 is charged to the reactor. After the epoxy addition, the reactor is sealed and sparged with a constant nitrogen purge for another 30 minutes at room temperature. After the 30 minute sparge, the reactor mix is heated to 100° C. While the reactor mix heats to 100° C., 579.10 g of ethoxy ethoxy ethyl acrylate and 201.10 g of 2-ethyl hexyl acrylate are charged to the feed vessel and sparged with a constant nitrogen purge. When the reactor mix reaches 100° C., time is set to zero (T=0). At T=15 minutes, a sample is taken for Gas Chromatography Analysis to check for monomer conversion. After monomer conversion is confirmed (approximately 30 minutes, T=45), the reactor mix is held under reflux at a temperature between 110° C. and 117° C. until the epoxy is >90% converted (approximately 70% 2-EHA and EOEOEA conversion). At this conversion, the reagent feed mixture with an active nitrogen purge is added over a period of 180 minutes to the reactor. During the reagent feed the temperature of the reaction is held under reflux at 110-118° C. The reaction conditions are maintained after completion of the reagent feed until a conversion of 80% of 2-EHA and EOEOEA is achieved. This is to create the remainder of the non-reactive segment adjacent to the function end segment. At this conversion, 13.40 g of Synasia Epoxy S-100 and 13.40 g of propyl acetate are rapidly fed to the reactor (approximately 2 min.) to create the final functional end segment. The reaction conditions are maintained until a conversion of 2-EHA and EOEOEA greater than 98% is achieved. The resulting solution polymer is then cooled to ambient temperature and discharged from the reactor. The total theoretical Mn of the polymer is 41,000 g/mol. The non-reactive middle segment is 32,000 g/mol and the functional end segments are 4,500 g/mol each.

The measured molecular weight (Mn) of the total acrylic polymer is 20,043 g/mol (determined by gel permeation chromatography relative to polystyrene standards) and the polydispersity is 3.02. The calculated Mw is therefore 60,530 g/mole.

Example 6: Polymerization with Single Functional End Segment (Tadpole), Example Having Alcohol Functionality Using SFRP Agent An acrylic copolymer with reactive functionality positioned in the segment adjacent to the polymer chain end, shown as (28):

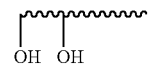

(28)

is prepared as follows. Into a 1500 ml reactor equipped with a heating jacket, agitator, reflux condenser, feed tanks and nitrogen gas inlet there is charged 11.41 g of Blocbuilder. Monomers are added to a feed vessel in the following amounts:

105.93 g of n-butyl acrylate;
26.48 g of tert. butyl acrylate; and
17.26 g of 4-hydroxy propyl acrylate The Blocbuilder in the reactor and the monomers and solvent in the feed vessel are sparged with a constant nitrogen purge for 30 minutes at room temperature. After the hold, the monomer and solvent mix is fed to the reactor to generate a small portion of the reactive segment adjacent from reactive polymer mode in order to add acrylate groups the Blocbuilder. The reactor charge mixture then is heated to greater than 70° C. (reactor jacket 75° C.) and held for 30 min. After the second hold, the reactor mix is heated to 100° C. While the reactor mix heats to 100° C., 1071.14 g of butyl acrylate and 267.78 g of tert-butyl acrylate are charged to the feed vessel and sparged with a constant nitrogen purge. When the reactor mix reaches 100° C., a timer is set to zero (T=0) and held between 100 and 105° C. At T=15 minutes, a sample is taken for Gas Chromatography Analysis to check for monomer conversion. After monomer conversion is confirmed (approximately 30 minutes, T=45), the reactor mix is held at a temperature between 100° C. and 105° C. until >80% converted butyl acrylate. At this conversion, the reagent feed mixture with an active nitrogen purge is added over a period of 180 minutes to the reactor. During the reagent feed the temperature of the reaction is held between at 100-105° C. The reaction conditions are maintained after completion of the reagent feed until a butyl acrylate conversion greater than 98% is achieved. The resulting polymer is then cooled to ambient temperature and discharged from the reactor. The total theoretical Mn of the polymer is 50,000 g/mol. The non-reactive segment is 45,000 g/mol and the functional end segment is 5,000 g/mol each.

The measured molecular weight (Mn) of the total acrylic polymer is 53,591 g/mol (determined by gel permeation chromatography relative to polystyrene standards) and the polydispersity is 1.51. The calculated Mw is therefore 80,922.

Example 7: Random Functional Distribution Example Having Alcohol Functionality An acrylic copolymer with reactive functionality positioned randomly throughout the polymer chain, as generally shown below as (29):

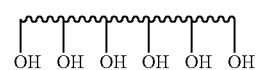

(29)

is prepared as follows. Into a 1500 ml reactor equipped with a heating jacket, agitator, reflux condenser, feed tanks and nitrogen gas inlet there is charged 139.37 g of toluene. Monomers are added to a feed vessel in the following amounts:

83.16 g of 2-ethyl hexyl acrylate;
239.51 g of ethoxy ethoxy ethyl acrylate; and
9.98 g of 4-hydroxy propyl acrylate To a second feed vessel, solvent and initiator are added in the following amounts:
3.33 g of lauryl peroxide; and
30.00 g of toluene The toluene in the reactor, initiator mix, and the monomers in the feed vessel are sparged with a constant nitrogen purge for 30 minutes at room temperature. After the hold, the toluene in the reactor is heated to 105° C., in which there is a light reflux off the condenser. At this point, the monomer and initiator mix is fed over 90 minutes to the reactor. During the reagent and initiator feed, the reactor mix is held at a temperature between 105° C. and 116° C. under reflux. The reaction conditions are maintained after completion of the reagent and initiator feed for 60 minutes. During the 60 minute hold, a cook-off catalyst feed is prepared in a feed vessel. The cook-off catalyst feed consisted of 24.28 g of toluene and 0.37 g of t-Amyl peroxy pivalate. The cook-off catalyst is sparged under a constant nitrogen purge for 15 minutes. After the 60 minute hold, the cook-off catalyst is fed over 30 minutes to the reactor. Once the cook-off catalyst feed is depleted, the reaction is maintained >110° C. for 60 minutes. The resulting solution polymer is then cooled to ambient temperature and discharged from the reactor.

The measured molecular weight (Mn) of the total acrylic polymer is 13,301 g/mol (determined by gel permeation chromatography relative to polystyrene standards) and the polydispersity is 2.76. The calculated Mw is therefore 36,711.

Examples 8-39

Examples 8-33 are based upon an acrylic polymer mixed with reactive diluents and structural components triggered by UV exposure to transform the adhesive from liquid to solid PSA, and cured to full strength (structural) by heat.

Examples 8-33 are set forth in Table 7.

TABLE 7

Examples 8-33 of Adhesive Compositions

| Example | Radical Addition Diluents | Bodying Components | Structural Components | | *IR | Thickness (mils) | *Rolling Back Tack (mm) A-Stage | *Rolling Back Tack (mm) B-stage | CW (gsm) |
|---|---|---|---|---|---|---|---|---|---|
| 8 | 29.4% ACE | 29.4% EB13-84 | 41.2% 828 | | | 34 | 22 | | |
| 9 | 29.4% ACE | 29.4% EB13-84 | 41.2% 828 | 0.5% A-186 | | 57 | 30 | | |
| 10 | 29.4% ACE | 29.4% EB13-84 | 41.2% 828 | 3% A-186 | | 30 | 28 | | |
| 11 | 29.4% ACE | 29.4 % LRK3-33 | 41.2% 828 | | | 26 | 24 | | |
| 12 | 29.4% ACE | 29.4 % LRK3-33 | 41.2% 828 | | | 18 | 22 | | |
| 13 | 29.4% ACE | 29.4% LRK3-44 | 41.2% 828 | | | 16 | 20 | | |
| 14 | 29.4% ACE | 29.4% PP81-56 | 41.2% 828 | | | 24 | 24 | | |
| 15 | 29.4% ACE | 29.4% PP81-56 | 41.2% 828 | | | 40 | 24 | | |
| 16 | 29.4% ACE | 29.4% PP81-67 | 41.2% 828 | | | 38 | 24 | | |
| 17 | 29.4% ACE | 29.4% PP81-67 | 41.2% 828 | | | 36 | 24 | | |
| 18 | 29.4% ACE | 29.4 % KH4-18 | 41.2% 828 | | | 20 | 16 | | |
| 19 | 29.4% ACE | 29.4% LRK3-44 | 8% D2000 | 32.3% 828 | | 22 | 28 | | |
| 20 | 28.1% ACE | 27.2% LRK3-44 | 7.3% EB230 | 37.4% 828 | | 12 | 16 | | |
| 21 | 18.2% ACE | 8% KH4-37 | 73.8% 828 | | | 138 | 10 | | |
| 22 | 37.7% ACE | 12% KH4-37 | 50.2% 828 | | | 60 | 28 | 5 | >180 122 |
| 23 | 17.5% ACE | 12% KH4-37 | 70.5% 828 | | | 56 | 24 | | |
| 24 | 17.6% ACE | 12% KH4-46 | 70.5% 828 | | | 160 | 22 | | |
| 25 | 17.6% ACE | 12% KH4-46 | 70.5% 828 | 3% A-186 | | 160 | 24 | | |
| 26 | 16.5% ACE | 16.5% KH4-37 | 67.1 828 | | | 30 | 15 | | |
| 27 | 16.8% ACE | 16% KH4-37 | 67.1% 828 | 1.5% A-186 | | 24 | 14 | | |
| 28 | 16.4% ACE | 18% KH4-46 | 65.6% 828 | | | 52 | 14 | | |
| 29 | 14.1% ACE | 29.4% KH4-46 | 56.5% 828 | | | 40 | 24 | | |
| 30 | 29.4% ACE | 29.4% KH4-46 | 41.2% 828 | | | 22 | 24 | | |

TABLE 7-continued

Examples 8-33 of Adhesive Compositions

| Example | Radical Addition Diluents | Bodying Components | Structural Components | | *IR | Thickness (mils) | *Rolling Back Tack (mm) A-Stage | *Rolling Back Tack (mm) B-stage | CW (gsm) |
|---|---|---|---|---|---|---|---|---|---|
| 31 | 29.4% ACE | 29.4% KH4-46 | 41.2% 828 | 3% A-186 | 26 | 26 | | | |
| 32 | 29.4% ACE | 29.4% KH4-37 | 41.2% 828 | | 42 | 26 | | | |
| 33 | 29.4% ACE | 29.4% KH4-37 | 41.2% 828 | 3% A-186 | 30 | 24 | | | |

In Table 7, IR refers to Impact Resistance, determined in accordance with ASTM-G14-04 (2010). Rolling Ball Tack is determined in accordance with ASTM-D3121-06.

Examples 34-36 illustrate lap shear and Rolling Ball Tack measurements for additional adhesive compositions of the present subject matter.

Example 34 is an acrylic polymer mixed with structural components and dried via mild heat to a PSA, and then full cure triggered by higher heat to produce a structural bond between two substrates.

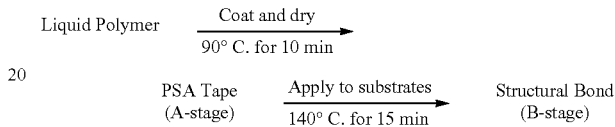

Lap Shear Data (AI to AI) for Example 34 is presented in Table 8.

TABLE 8

Lap Shear Data

15 MIN DWELL A STAGE

| ADDITIVE | % BOS | PEAK LOAD (lbf) Avg. Value | % Change | MODULUS (psi) Avg. Value | % Change |
|---|---|---|---|---|---|
| 100% S-21 | 30 | 28.65 | −59% | 2.25E+06 | −44% |
| 100% S-21 | 40 | 35.75 | −48% | 3.36E+06 | −16% |
| PSA Control | | 69.25 | — | 4.02E+06 | — |

15 MIN DWELL A STAGE

| ADDITIVE | % BOS | PEAK LOAD (lbf) Avg. Value | % Change | MODULUS (psi) Avg. Value | % Change |
|---|---|---|---|---|---|
| 100% S-21 | 30 | 373.25 | 439% | 1.65E+07 | 310% |
| 100% S-21 | 40 | 349.95 | 405% | 1.57E+07 | 292% |
| PSA Control | 69.25 | 69.25 | — | 4.02E+06 | — |

Example 35 is an acrylic polymer mixed with both a reactive oligomer and structural components and dried via mild heat to a PSA, and then full cure triggered by higher heat to produce a structural bond between two substrates.

Example 36 is an acrylic polymer mixed with reactive diluents and structural components triggered by low heat exposure to transform the adhesive from liquid to PSA, and cured to full strength (structural) by higher heat.

Figure 3:
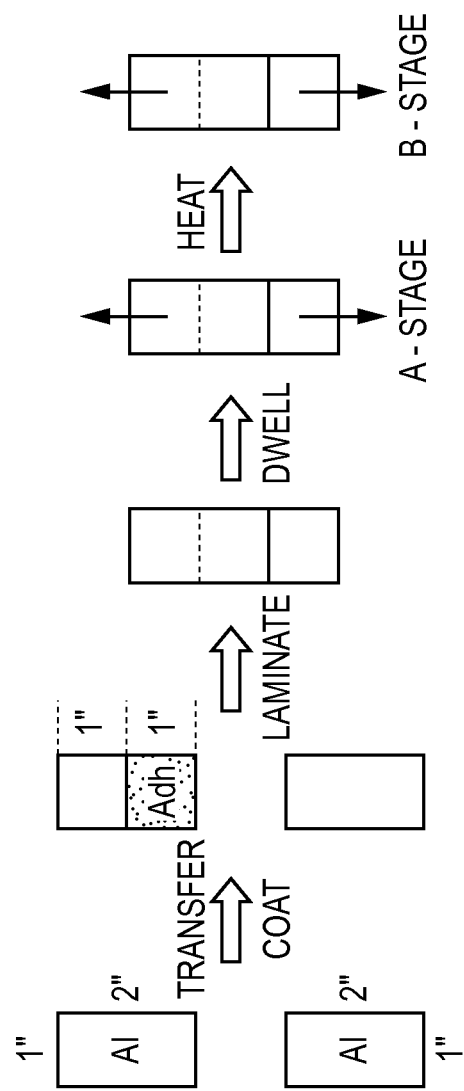
FIG. 3 depicts a procedure for a Lap Shear Test for Example 34.

Example 34: AS-2549 acrylic PSA is crosslinked with AAA and mixed with Synasia S-21 epoxy and dried mildly at 90° C. for 10 min to cast a solvent free PSA film. The initiator for thermal cure of the epoxy is mostly at temperatures less than inactive 95° C. After drying the film to produce a PSA tape, the tape may be applied to given substrates that are desired to be bonded. Once the tape is applied, additional heat is applied to initiate the adhesive to transform to full strength. The structural bond is created at 140° C. for 15 minutes. A depiction of the Lap Shear Test for Example 34 is shown in FIG. 3. The procedure is as follows:

Lap Shear is determined as follows. ASTM D-1002 Standard Test Method for Apparent Shear Strength of Single Lap Joint Adhesively Bonded Metal Specimens by Tension Loading (Metal to Metal) (reference). Adhesive thickness is 0.0024 inch+/−0.0006 inch. The loading is at 1 inch/minute. Peak load is measured.

Figure 4:
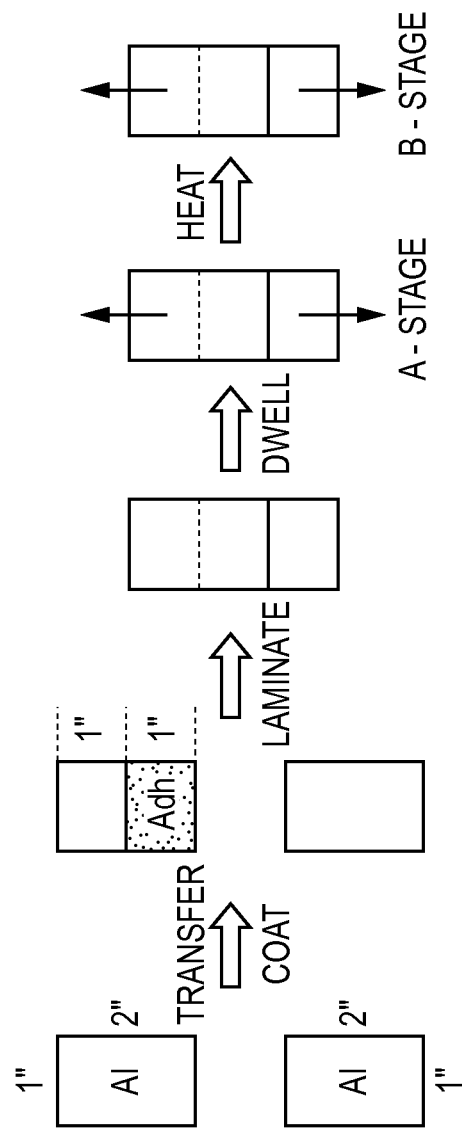
FIG. 4 depicts a procedure for a Lap Shear Test for Example 35.

Example 35: AS-2549 acrylic PSA is crosslinked with AAA and mixed with Synasia S-21 epoxy and KH4-67 and dried mildly at 90° C. for 10 min to cast a solvent free PSA film. The initiator for thermal cure of the epoxy is mostly inactive at temperatures less than 95° C. After drying the film to produce a PSA tape, the tape may be applied to substrates that are desired to be bonded. Once the tape is applied, additional heat is applied to initiate the adhesive to transform to full strength. The structural bond is created at 140° C. for 15 minutes. FIG. 4 depicts the procedure for the Lap Shear Test for Example 35.

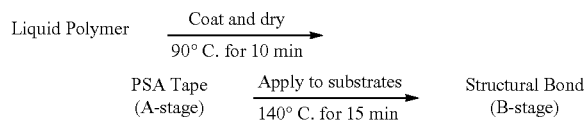

Lap Shear Data (Al to Al) for Example 35 is presented in Table 9.

TABLE 9

Lap Shear Data

15 MIN DWELL A STAGE

| | | PEAK LOAD (lbf) | | MODULUS (psi) | |
|---|---|---|---|---|---|
| ADDITIVE | % BOS | Avg. Value | % Change | Avg. Value | % Change |
| 75/25 S21/KH4-67 | 30 | 46.60 | −33% | 3.73E+06 | −7% |
| 75/25 S21/KH4-67 | 40 | 30.10 | −57% | 2.38E+06 | −41% |
| PSA Control | | 69.25 | — | 4.02E+06 | — |

15 MIN DWELL A STAGE

| | | PEAK LOAD (lbf) | | MODULUS (psi) | |
|---|---|---|---|---|---|
| ADDITIVE | % BOS | Avg. Value | % Change | Avg. Value | % Change |
| 75/25 S21/KH4-67 | 30 | 229.45 | 231% | 1.37E+07 | 241% |
| 75/25 S21/KH4-67 | 40 | 348.05 | 403% | 1.49E+07 | 271% |
| PSA Control | | 69.25 | 69.25 | — | 4.02E+06 | — |

Example 36: KH4-105 an acrylic oligomer is mixed with EPON 828 epoxy, TMPO and Siloquest A-187. It is cured mildly at 110° C. for 7 min to cast a PSA film. The initiator for thermal cure of the epoxy is very slow at temperatures less than 110° C. After drying the film to produce a PSA tape, the tape may be applied to substrates that are desired to be bonded. Once the tape is applied, additional heat is applied to initiate the adhesive to transform to full strength. The structural bond is created at 140° C. for 15 minutes.

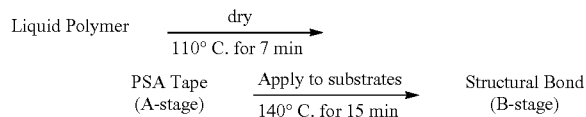

Lap shear data (Al to Al) for Example 36 is presented in Table 10.

TABLE 10

Rolling Ball Tack Data for Example 36

| | After 110° C. for 7 min | After 140° C. for 15 min |
|---|---|---|
| Rolling Ball Tack (mm) ASTM# D3121-06 | 65 (avg) | >180 |

Figure 5:
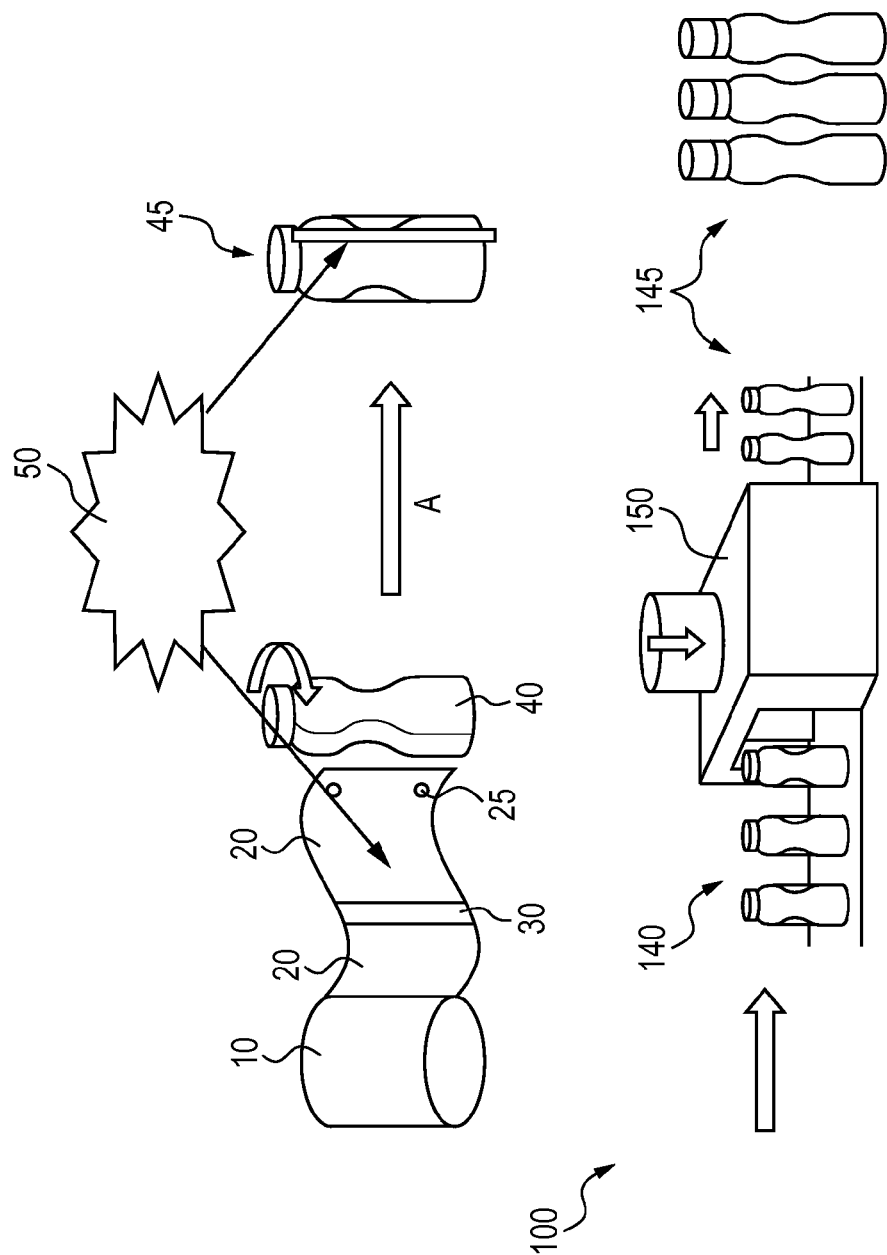
FIG. 5 depicts a schematic illustration of applying a liquid to a substrate and subsequently curing the liquid in place by exposure to actinic radiation.

Example 37: A liquid in accordance with the present subject matter is applied to a substrate and subsequently cured in place by exposure to actinic radiation. An illustration is depicted in FIG. 5. Specifically, FIG. 5 schematically depicts application of a liquid or other composition onto a film, label, and/or container, and exposure to actinic radiation to thereby cure the liquid or composition in place. A source of film or labels 10 having a region, face, or surface coated with liquid or composition 20 as described herein is provided. In certain embodiments, one or more regions 25 or strips 30 of tacky adhesive can be provided to assist in initially securing the film or label to a container of interest 40. Prior to, during, and/or after appropriate application of the film or label to the container, actinic radiation 50 is directed to the coating to thereby adhere and/or cure the coating and produce a labeled container 45. This is generally denoted as operation A in FIG. 5. After initial application of the film or label, wiping and/or application of heat can be performed. Additional operations can be performed prior to, during, and/or after operation(s) A. FIG. 5 also schematically illustrates a continuous process 100 in which a plurality of containers 140 receive films or labels, are exposed to actinic radiation within an enclosure 150 to thereby produce a plurality of labeled containers 145.

Table 11, below, includes exemplary formulations that represent embodiments of the present subject matter. The formulations include a bodying component, radical addition diluent, structural diluent and photoinitiator and additive (i.e., Irganox® 1010) as set forth below.

TABLE 11

Exemplary Embodiments of Adhesive Compositions

| Formulation ID | Bodying Component ID | Radical Addition Diluent Rel % | Radical Addition Diluent ID | Structural Diluent Rel % | Structural Diluent ID | Photoinitiator Rel % | Photoinitiator ID | % Total | Other ID | Other Total |
|---|---|---|---|---|---|---|---|---|---|---|
| MW1-70-1 | MW1-68 (MJZ4-87-1) | 70 | TMPO | 15 | S28 | 15 | UVACure 1600 | 1.5 | | |
| MW1-70-2 | MW1-68 (MJZ4-87-1) | 70 | TMPO | 15 | S28 | 15 | Tego 1466 | 3 | | |
| MW1-70-3 | MW1-68 (MJZ4-87-1) | 70 | TMPO | 15 | S28 | 15 | Irgacure 250 | 1.5 | | |
| MW1-70-4 | MW1-68 (MJZ4-87-1) | 50 | TMPO | 25 | S28 | 25 | UVACure 1600 | 1.5 | | |
| MW1-70-5 | MW1-69 | 70 | TMPO | 15 | S28 | 15 | UVACure 1600 | 1.5 | | |
| MW1-70-6 | MW1-69 | 70 | TMPO | 15 | S28 | 15 | Tego 1466 | 3 | | |
| MW1-70-7 | MW1-69 | 70 | TMPO | 15 | S28 | 15 | Irgacure 250 | 1.5 | | |
| MW1-70-8 | MW1-69 | 50 | TMPO | 25 | S28 | 25 | UVACure 1600 | 1.5 | | |
| MW1-87-1 | MW1-68 (MJZ4-87-1) | 70 | ACE | 15 | SR-349 | 15 | Irgacure 500 | 2.5 | | |
| MW1-87-2 | MW1-68 (MJZ4-87-1) | 30 | ACE | 35 | SR-349 | 35 | Irgacure 500 | 2.5 | | |
| MW1-87-3 | MW1-68 (MJZ4-87-1) | 70 | CD611 | 6 | SR-349 | 24 | Irgacure 500 | 2.5 | | |
| MW1-87-4 | MW1-68 (MJZ4-87-1) | 30 | CD611 | 14 | SR-349 | 56 | Irgacure 500 | 2.5 | | |
| MW1-87-5 | MW1-68 (MJZ4-87-1) | 70 | SR-285 | 9 | SR-349 | 21 | Irgacure 500 | 2.5 | | |
| MW1-87-6 | MW1-68 (MJZ4-87-1) | 30 | SR-285 | 21 | SR-349 | 49 | Irgacure 500 | 2.5 | | |
| MW1-95-1 | MW1-94 | 100 | None | 0 | None | 0 | Irgacure 500 | 2.5 | | |
| MW1-95-2 | MW1-94 | 70 | None | 0 | SR-349 | 30 | Irgacure 500 | 2.5 | | |
| MW1-95-3 | MW1-94 | 70 | ACE | 15 | SR-349 | 15 | Irgacure 500 | 2.5 | | |
| MW1-95-4 | MW1-94 | 70 | ACE | 30 | None | 0 | Irgacure 500 | 2.5 | | |
| MW1-95-5 | MW1-94 | 50 | None | 0 | SR-349 | 50 | Irgacure 500 | 2.5 | | |
| MW1-95-6 | MW1-94 | 50 | ACE | 25 | SR-349 | 25 | Irgacure 500 | 2.5 | | |
| MW1-95-7 | MW1-94 | 50 | ACE | 50 | None | 0 | Irgacure 500 | 2.5 | | |
| MW1-95-8 | MW1-94 | 30 | None | 0 | SR-349 | 70 | Irgacure 500 | 2.5 | | |
| MW1-95-9 | MW1-94 | 30 | ACE | 35 | SR-349 | 35 | Irgacure 500 | 2.5 | | |
| MW1-95-10 | MW1-94 | 30 | ACE | 70 | None | 0 | Irgacure 500 | 2.5 | | |
| MW1-96-1 | MW1-91 | 100 | None | 0 | None | 0 | Irgacure 500 | 2.5 | | |
| MW1-96-2 | MW1-91 | 70 | None | 0 | SR-349 | 30 | Irgacure 500 | 2.5 | | |
| MW1-96-3 | MW1-91 | 70 | ACE | 15 | SR-349 | 15 | Irgacure 500 | 2.5 | | |
| MW1-96-4 | MW1-91 | 70 | ACE | 30 | None | 0 | Irgacure 500 | 2.5 | | |
| MW1-96-5 | MW1-91 | 50 | None | 0 | SR-349 | 50 | Irgacure 500 | 2.5 | | |
| MW1-96-6 | MW1-91 | 50 | ACE | 25 | SR-349 | 25 | Irgacure 500 | 2.5 | | |
| MW1-96-7 | MW1-91 | 50 | ACE | 50 | None | 0 | Irgacure 500 | 2.5 | | |
| MW1-96-8 | MW1-91 | 30 | None | 0 | SR-349 | 70 | Irgacure 500 | 2.5 | | |
| MW1-96-9 | MW1-91 | 30 | ACE | 35 | SR-349 | 35 | Irgacure 500 | 2.5 | | |
| MW1-96-10 | MW1-91 | 30 | ACE | 70 | None | 0 | Irgacure 500 | 2.5 | | |
| MW1-102 | MW1-101 | 70 | HEA | 15 | SR-349 | 15 | Irgacure 2959 | 2.5 | | |
| MW2-C1 | MW1-101 | 70 | ACE | 15 | SR-349 | 15 | Irgacure 500 | 5 | | |
| MW2-001A | MW1-101 | 70 | ACE | 15 | SR-349 | 15 | Irgacure 500 | 5 | Irganox 1010 | 0.1 |
| MW2-001B | MW1-101 | 50 | ACE | 25 | SR-349 | 25 | Irgacure 500 | 5 | Irganox 1010 | 0.1 |
| MW2-001C | MW1-101 | 70 | Phenoxyethyl acrylate | 15 | Ebecryl | 15 | Irgacure 2959 | 5 | Irganox 1010 | 0.1 |
| MW2-001D | MW1-101 | 50 | Phenoxyethyl acrylate | 25 | Ebecryl TMPTA | 25 | Irgacure 2959 | 5 | Irganox 1010 | 0.1 |
| MW2-001E | MW1-101 | 70 | Phenoxyethyl acrylate | 6 | Ebecryl TMPTA | 24 | Irgacure 2959 | 5 | Irganox 1010 | 0.1 |
| MW2-001F | MW1-101 | 50 | Phenoxyethyl acrylate | 10 | Ebecryl TMPTA | 40 | Irgacure 2959 | 5 | Irganox 1010 | 0.1 |
| MW2-001G | MW1-101 | 70 | Phenoxyethyl acrylate | 15 | TPGDA | 15 | Irgacure 2959 | | Irganox 1010 | 0.1 |
| MW2-001H | MW1-101 | 50 | Phenoxyethyl | 25 | TPGDA | 25 | Irgacure 2959 | | Irganox 1010 | 0.1 |
| MW2-0011 | MW1-101 | 70 | Phenoxyethyl acrylate | 15 | 3E0 TMPTA | 15 | Irgacure 2959 | | Irganox 1010 | 0.1 |
| MW2-001J | MW1-101 | 50 | Phenoxyethyl acrylate | 25 | 3E0 TMPTA | 25 | Irgacure 2959 | | Irganox 1010 | 0.1 |
| MW2-001K | MW1-101 | 70 | Phenoxyethyl acrylate | 15 | TMPTA | 15 | Irgacure 2959 | | Irganox 1010 | 0.1 |
| MW2-001L | MW1-101 | 50 | Phenoxyethyl acrylate | 25 | TMPTA | 25 | Irgacure 2959 | | Irganox 1010 | 0.1 |

The following Table 12 shows selected performance data for certain of the formulations in Table 11.

TABLE 12

Performance Data for Selected Formulations from Table 11

| | Formulation | Units | MW-1-87-1 | MW1-87-2 | MW1-87-3 | MW1-875 |
|---|---|---|---|---|---|---|
| Tensile Strength | Reading 1 | lbf | 17.4 | 12.5 | 14.0 | 12.7 |
| | Reading 2 | lbf | 16.6 | 12.2 | 14.9 | 12.2 |
| | Reading 3 | lbf | 16.6 | 12.5 | 12.9 | 10.7 |
| | Reading 4 | lbf | 16.0 | | 14.7 | 10.7 |
| | Average | lbf | 16.7 | 12.4 | 14.1 | 11.6 |
| | St Dev. | | 0.6 | 0.2 | 0.9 | 1.0 |
| | Cross Sect Area | sq in | 0.0020 | 0.0020 | 0.0020 | 0.0020 |
| | | psi | 8325.0 | 6200.0 | 7062.5 | 5787.5 |

TABLE 12-continued

Performance Data for Selected Formulations from Table 11

| Formulation | Units | MW-1-87-1 | MW1-87-2 | MW1-87-3 | MW1-875 |
|---|---|---|---|---|---|
| T-Peel Reading 1 | lbf | 2.8 | 0.1 | 4.2 | 3.4 |
| Reading 2 | lbf | 2.0 | | 3.9 | 3.3 |
| Reading 3 | lbf | 3.0 | | 3.7 | 3.0 |
| Reading 4 | lbf | | | 4.0 | 3.4 |
| Average | lbf | 2.6 | 0.1 | 4.0 | 3.3 |
| St Dev | | 0.5 | 0.0 | 0.2 | 0.2 |

Example 38: Two additional adhesive compositions according to the present subject matter are set forth below in Tables 13 and 14.

TABLE 13

Adhesive Composition EXP-MW2-070-A

| Component | Type | Chemical | Tradename | Description | Loading | Example |
|---|---|---|---|---|---|---|
| Bodying Agent | Polymer | Polybutylmethacrylate (PBMA) | Elvacite 2044 (Lucite International) | Mw=142,000 PDI Unknown | 1-20% | 85.29% |
| Diluent | Monofunctional Monomer | Urethane acrylate CAS: 63225-53-6 Product of hydroxyethyl acrylate with butyl isocyanate | Genomer 1122 (Rahn Corp) | | 80-99% | 9.48% |
| Photoinitiator | | | Irgacure 2959 (BASSF) | | 1-5% | 4.99% |
| Antioxidant | | | Irganox 1010 | | 0.1-1% | 0.25% |

TABLE 14

Adhesive Composition EXP-MW2-070-B

| Component | Type | Chemical | Tradename | Description | Loading | Example |
|---|---|---|---|---|---|---|
| Bodying Agent | Polymer | Polybutyl-methacrylate (PBMA) | Elvacite 2044 (Lucite Internation) | Mw=142,000 PDI Unknown | 1-20% | 85.29% |
| Diluent | Monofunctional Monomer | Low viscosity aromatic oligomer, hydroxyl functional | CN-131B (Sartomer) | | 80-99% | 9.48% |
| Photoinitiator | | | Irgacure 2959 (BASSF) | | 1-5% | 4.99% |
| Antioxidant | | | Irganox 1010 | | 0.1-1% | 0.25% |

Example 39: Several additional compositions according to the present subject matter are set forth below in Tables 15 and 16. A particular application for these compositions is in "roll on, shrink on" (ROSO) labeling or related technologies.

TABLE 15

Roll On, Shrink On Compositions

| | Bodying Component | | Radical Addition Diluent | | Structural Diluent | | Photoinitiator | | Other | |
|---|---|---|---|---|---|---|---|---|---|---|
| Formulation ID | ID | Rel % | ID | Rel % | ID | Rel % | ID | Rel % | ID | Rel % |
| MW2-70-A | Elvacite 2044 | 9.54 | Genomer 1122 | 85.91 | None | 0 | Irgacure 2959 | 4.3 | Irganox 1010 | 0.25 |
| MWS-70-B | Elvacite 2044 | 9.54 | CN-131B | 85.91 | None | 0 | Irgacure 2959 | 4.3 | Irganox 1010 | 0.25 |
| MW3-016 | Polystyrene | 9.75 | CN-131 | 87.75 | None | 0 | Irgacure 2959 | 2.5 | None | |

TABLE 16

Roll On, Shrink On Compositions

| Formulation ID | Bodying Component | | Radical Addition Diluent | | Structural Diluent | | Photoinitiator | | Other | |
|---|---|---|---|---|---|---|---|---|---|---|
| | ID | Rel % | ID | Rel % | ID | Rel % | ID | Rel % | ID | Rel % |
| MW1-70-1 | MW1-68 (MJZ4-87-1) | 70 | TMPO | 15 | S28 | 15 | UVACure 1600 | 1.5 | | |
| MW1-70-2 | MW1-68 (MJZ4-87-1) | 70 | TMPO | 15 | S28 | 15 | Tego 1466 | 3 | | |
| MW1-70-3 | MW1-68 (MJZ4-87-1) | 70 | TMPO | 15 | S28 | 15 | Irgacure 250 | 1.5 | | |
| MW1-70-4 | MW1-68 (MJZ4-87-1) | 50 | TMPO | 25 | S28 | 25 | UVACure 1600 | 1.5 | | |
| MW1-70-5 | MW1-69 | 70 | TMPO | 15 | S28 | 15 | UVACure 1600 | 1.5 | | |
| MW1-70-6 | MW1-69 | 70 | TMPO | 15 | S28 | 15 | Tego 1466 | 3 | | |
| MW1-70-7 | MW1-69 | 70 | TMPO | 15 | S28 | 15 | Irgacure 250 | 1.5 | | |
| MW1-70-8 | MW1-69 | 50 | TMPO | 25 | S28 | 25 | UVACure 1600 | 1.5 | | |
| MW1-87-1 | MW1-68 (MJZ4-87-1) | 70 | ACE | 15 | SR-349 | 15 | Irgacure 500 | 2.5 | | |
| MW1-87-2 | MW1-68 (MJZ4-87-1) | 30 | ACE | 35 | SR-349 | 35 | Irgacure 500 | 2.5 | | |
| MW1-87-3 | MW1-68 (MJZ4-87-1) | 70 | CD611 | 6 | SR-349 | 24 | Irgacure 500 | 2.5 | | |
| MW1-87-4 | MW1-68 (MJZ4-87-1) | 30 | CD611 | 14 | SR-349 | 56 | Irgacure 500 | 2.5 | | |
| MW1-87-5 | MW1-68 (MJZ4-87-1) | 70 | SR-285 | 9 | SR-349 | 21 | Irgacure 500 | 2.5 | | |
| MW1-87-6 | MW1-68 (MJZ4-87-1) | 30 | SR-285 | 21 | SR-349 | 49 | Irgacure 500 | 2.5 | | |
| MW1-95-1 | MW1-94 | 100 | None | 0 | None | 0 | Irgacure 500 | 2.5 | | |
| MW1-95-2 | MW1-94 | 70 | None | 0 | SR-349 | 30 | Irgacure 500 | 2.5 | | |
| MW1-95-3 | MW1-94 | 70 | ACE | 15 | SR-349 | 15 | Irgacure 500 | 2.5 | | |
| MW1-95-4 | MW1-94 | 70 | ACE | 30 | None | 0 | Irgacure 500 | 2.5 | | |
| MW1-95-5 | MW1-94 | 50 | None | 0 | SR-349 | 50 | Irgacure 500 | 2.5 | | |
| MW1-95-6 | MW1-94 | 50 | ACE | 25 | SR-349 | 25 | Irgacure 500 | 2.5 | | |
| MW1-95-7 | MW1-94 | 50 | ACE | 50 | None | 0 | Irgacure 500 | 2.5 | | |
| MW1-95-8 | MW1-94 | 30 | None | 0 | SR-349 | 70 | Irgacure 500 | 2.5 | | |
| MW1-95-9 | MW1-94 | 30 | ACE | 35 | SR-349 | 35 | Irgacure 500 | 2.5 | | |
| MW1-95-10 | MW1-94 | 30 | ACE | 70 | None | 0 | Irgacure 500 | 2.5 | | |
| MW1-96-1 | MW1-91 | 100 | None | 0 | None | 0 | Irgacure 500 | 2.5 | | |
| MW1-96-2 | MW1-91 | 70 | None | 0 | SR-349 | 30 | Irgacure 500 | 2.5 | | |
| MW1-96-3 | MW1-91 | 70 | ACE | 15 | SR-349 | 15 | Irgacure 500 | 2.5 | | |
| MW1-96-4 | MW1-91 | 70 | ACE | 30 | None | 0 | Irgacure 500 | 2.5 | | |
| MW1-96-5 | MW1-91 | 50 | None | 0 | SR-349 | 50 | Irgacure 500 | 2.5 | | |
| MW1-96-6 | MW1-91 | 50 | ACE | 25 | SR-349 | 25 | Irgacure 500 | 2.5 | | |
| MW1-96-7 | MW1-91 | 50 | ACE | 50 | None | 0 | Irgacure 500 | 2.5 | | |
| MW1-96-8 | MW1-91 | 30 | None | 0 | SR-349 | 70 | Irgacure 500 | 2.5 | | |
| MW1-96-9 | MW1-91 | 30 | ACE | 35 | SR-349 | 35 | Irgacure 500 | 2.5 | | |
| MW1-96-10 | MW1-91 | 30 | ACE | 70 | None | 0 | Irgacure 500 | 2.5 | | |
| MW1-102 | MW1-101 | 70 | HEA | 15 | SR-349 | 15 | Irgacure 295 | 92.5 | | |
| MW2-C1 | MW1-101 | 70 | ACE | 15 | SR-349 | 15 | Irgacure 500 | 5 | | |
| MW2-001A | MW1-101 | 70 | ACE | 15 | SR-349 | 15 | Irgacure 500 | 5 | Irganox 1010 | 0.1 |
| MW2-001B | MW1-101 | 50 | ACE | 25 | SR-349 | 25 | Irgacure 500 | 5 | Irganox 1010 | 0.1 |
| MW2-001C | MW1-101 | 70 | Phenoxyethyl acrylate | 15 | Ebecryl 600 | 15 | Irgacure 2959 | 5 | Irganox 1010 | 0.1 |
| MW2-001D | MW1-101 | 50 | Phenoxyethyl acrylate | 25 | Ebecryl 600 | 25 | Irgacure 2959 | 5 | Irganox 1010 | 0.1 |
| MW2-001E | MW1-101 | 70 | Phenoxyethyl acrylate | 6 | Ebecryl 600 | 24 | Irgacure 2959 | 5 | Irganox 1010 | 0.1 |
| MW2-001F | MW1-101 | 50 | Phenoxyethyl acrylate | 10 | Ebecryl 600 | 40 | Irgacure 2959 | 5 | Irganox 1010 | 0.1 |
| MW2-001G | MW1-101 | 70 | Phenoxyethyl acrylate | 15 | TPGDA | 15 | Irgacure 2959 | 5 | Irganox 1010 | 0.1 |
| MW2-001H | MW1-101 | 50 | Phenoxyethyl acrylate | 25 | TPGDA | 25 | Irgacure 2959 | 5 | Irganox 1010 | 0.1 |
| MW2-001I | MW1-101 | 70 | Phenoxyethyl acrylate | 15 | 3EO TMPTA | 15 | Irgacure 2959 | 5 | Irganox 1010 | 0.1 |
| MW2-001J | MW1-101 | 50 | Phenoxyethyl acrylate | 25 | 3EO TMPTA | 25 | Irgacure 2959 | 5 | Irganox 1010 | 0.1 |
| MW2-001K | MW1-101 | 70 | Phenoxyethyl acrylate | 15 | TMPTA | 15 | Irgacure 2959 | 5 | Irganox 1010 | 0.1 |
| MW2-001L | MW1-101 | 50 | Phenoxyethyl acrylate | 25 | TMPTA | 25 | Irgacure 2959 | 5 | Irganox 1010 | 0.1 |

Many other benefits will no doubt become apparent from future application and development of this technology.

All patents, published applications, and articles noted herein are hereby incorporated by reference in their entirety.

The present subject matter includes combinations of components and aspects of the various compositions described herein. Thus, for example, the present subject matter includes one or more components and/or features of one embodiment combined with one or more other components and/or features of other embodiment(s).

As described hereinabove, the present subject matter solves many problems associated with previous strategies, systems, and/or devices. However, it will be appreciated that various changes in the details, materials, and arrangements of components, which have been herein described and illustrated in order to explain the nature of the present subject matter, may be made by those skilled in the art without departing from the principle and scope of the claimed subject matter, as expressed in the appended claims.

What is claimed:

1. A cure in place liquid composition consisting of:
20-80 wt % of a bodying component comprising a prepolymerized acrylic backbone base polymer having a molecular weight (Mw) of 5,000 to 1,000,000;
5-50 wt % of at least one structural diluent;
10-80 wt % of at least one radical addition diluent;
0-4.0 wt % crosslinker;
0.001-4.0 wt % of a first curative;
0.01-10 wt % of a second curative; and
0-10.0 wt % stabilizer/process aid,
wherein the structural diluent is selected from the group consisting of 3,4-epoxycyclohexylmethyl-3,4-epoxycyclohexanecarboxylate (S-21), Bis[(3,4-epoxycyclohexyl)methyl]adipate (S-28), difunctional bisphenol A/epichlorohydrin derived liquid epoxy resin (Epon 828), Bisphenol A epoxy resin having a weight per epoxide of 235-263 g/eq as measured by ASTM D1652 (Epon 834), beta-(3,4-epoxycyclohexyl)ethyltrimethoxysilane (A-186), gamma-glycidoxypropyltrimethoxysilane (A-187), glycidyl ester of neodecanoic acid (EP-10), isocyanate-functional urethane acrylate (Desmolux D100), isocyanate-bearing urethane acrylate (Desmolux D200), aliphatic polyisocyanate (low-viscosity hexamethylene diisocyanate (HDI) biuret) (Desmodur N3200), aliphatic polyisocyanate (hexamethylene diisocyanate (HDI) biuret) (Desmodur N100), aliphatic polyisocyanate (hexamethylene diisocyanate (HDI) trimer) (Desmodur N3300), poly(propylene oxide) (PPO) oligomer having a molecular weight (Mw) of less than 5,000 daltons, trimethylolpropane oxetane (TMPO), poly(ethylene oxide) (PEO) oligomer having a molecular weight (Mw) of less than 5,000 daltons, ethyl hexyl oxetane (2EH oxetane), difunctional oxetane, ethoxylated bisphenol A diacrylate of the following formula (7) in which n+m=3, ethoxylated trimethylolpropane triacrylate of the following formula (8), bisphenol A diglycidyl ether diacrylate of the following formula (9), 1,2-cyclic ethers, 1,3-cyclic ethers, 1,4-cyclic ethers, anhydrides, lactones, lactams, cyclic ethers, siloxanes, oxazolines, oxalidines, and bismaleimides;

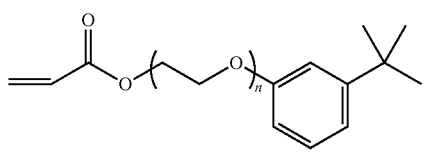
(7)

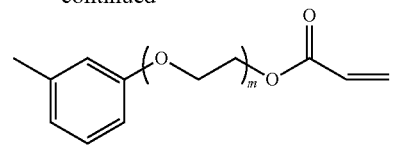
(8)

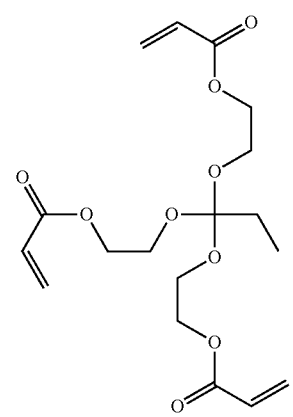
(9)

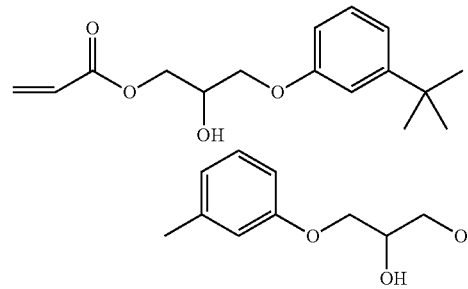

and wherein the radical addition diluent is selected from the group consisting of expoxy acrylate monomer (ACE™ hydroxyl acrylate), isostearyl acrylate, heptadecyl acrylate, dicyclopentadiene acrylate, 3-ethyl-3-(methyl acrylate) oxetane (OXE-10), 3-ethyl-3-(methyl methacrylate) oxetane (OXE-30), 3,4-epoxycyclohexyl methyl methacrylate (S-100), acrylic macromer having a molecular weight (Mw) of less than 10,000 daltons, 2-acryloyloxypropyl phthalate (V2100), 1,2-cyclohexanedicarboxylic acid, mono[1-methyl-2-[(1-oxo-2-propenyl)oxy]ethyl]ester (cycloaliphatic V21001, polyalkyl methacrylate (PAMA), alkoxylated tetrahydrofurfuryl (THF) acrylate of the following formula (1), tetrahydrofurfuryl acrylate (THFA or THF acrylate) of the following formula (4), and urethane acrylates having a molecular weight (Mw) of less than 2000 daltons,

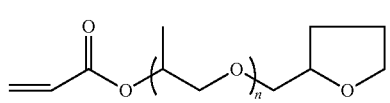
(1)

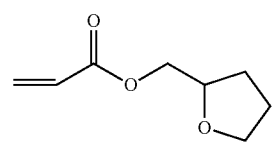
(4)

2. The composition of claim 1 wherein the first curative is an external catalyst.

3. The composition of claim 1 wherein the second curative is a photoinitiator.

4. The composition of claim 1 wherein each of the first curative and the second curative are activable by at least one of radiation, heat, moisture, pressure, ultrasound, exposure to chemical agents, and combinations thereof.

5. The composition of claim 1 wherein the acrylic backbone base polymer has a Mw of 15,000 to 250,000.

6. The composition of claim 5 wherein the acrylic backbone base polymer has a Mw of 15,000 to 100,000.

7. The composition of claim 1 consisting of:
30-50 wt % of the bodying component comprising an acrylic backbone base polymer having a Mw of 5,000 to 1,000,000;
5-40 wt % of at least one structural diluent;
50-70 wt % of at least one radical addition diluent;
0-4.0 wt % crosslinker;
0.001-4 wt % of the first curative;
0.01-10 wt % of the second curative; and
0-10.0 wt % stabilizer/process aid.

8. The composition of claim 7 wherein the acrylic backbone base polymer has a Mw of 15,000 to 100,000.

9. The liquid composition of claim 1 wherein the first curative is different from the second curative.

10. The composition of claim 1 wherein the bodying component comprises an acrylic block base polymer, the acrylic block base polymer comprising two functional end segments and one non-reactive middle segment, the reactive segments include one or more monomers of the non-reactive segment.

11. A cure in place liquid composition comprising:
20-80 wt % of a bodying component comprising a prepolymerized acrylic backbone base polymer having a molecular weight (Mw) of 5,000 to 1,000,000;
5-50 wt % of at least one structural diluent;
10-80 wt % of at least one radical addition diluent;
0-4.0 wt % crosslinker;
0-4.0 wt % of a first curative;
0.01-10 wt % of a second curative; and
0-10.0 wt % stabilizer/process aid,
wherein the structural diluent is selected from the group consisting of 3,4-epoxycyclohexylmethyl-3,4-epoxycyclohexanecarboxylate (S-21), Bis[(3,4-epoxycyclohexyl)methyl]adipate (S-28), difunctional bisphenol A/epichlorohydrin derived liquid epoxy resin (Epon 828), Bisphenol A epoxy resin having a weight per epoxide of 235-263 g/eq as measured by ASTM 1652 (Epon 834), beta-(3,4-epoxycyclohexyl)ethyltrimethoxysilane (A-186), gamma-glycidoxypropyltrimethoxysilane (A-187), glycidyl ester of neodecanoic acid (EP-10), isocyanate-functional urethane acrylate (Desmolux D100), isocyanate-bearin urethane acrylate (Desmolux D200), aliphatic polyisocyanate (low-viscosity hexamethylene diisocyanate (HDI) biuret) (Desmodur N3200), aliphatic polyisocyanate (hexamethylene diisocyanate (HDI) biuret) (Desmodur N100), aliphatic polyisocyanate (hexamethylene diisocynate (HDI) trimer) (Desmodur N3300), poly(propylene oxide) (PPO) oligomer having a molecular weight (Mw) of less than 5,000 daltons, trimethylolpropane oxetane (TMPO), poly(ethylene oxide) (PEO) oligomer having a molecular weight (Mw) of less than 5,000 daltons, ethyl hexyl oxetane (2EH oxetane), difunctional oxetane, ethoxylated bisphenol A diacrylate of the following formula (7) in which n+m=3, ethoxylated trimethylolpropane triacrylate of the following formula (8), bisphenol A diglycidyl ether diacrylate of the following formula (9), 1,2-cyclic ethers, 1,3-cyclic ethers, 1,4-cyclic ethers, butyrolactone, valerolactone, caprolactone, methy-butyrolactone, butyrolactam, valerolactam, caprolactam, cyclic ethers, siloxanes, oxazolines, oxalidines, bismaleimides,

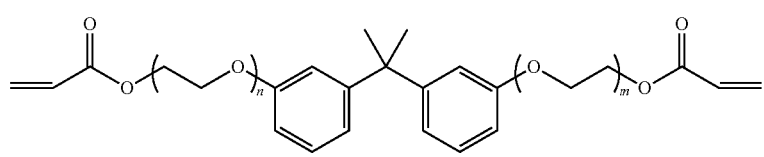

(7)

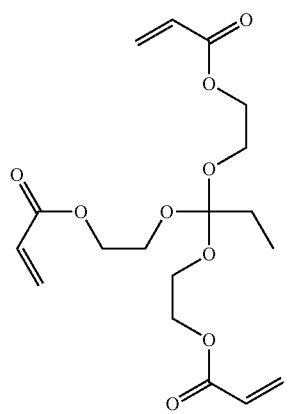

(8)

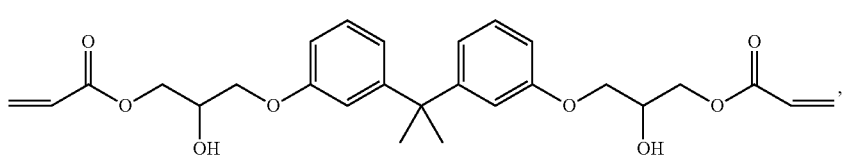

and
lactones of the following formulas (10)-(12)

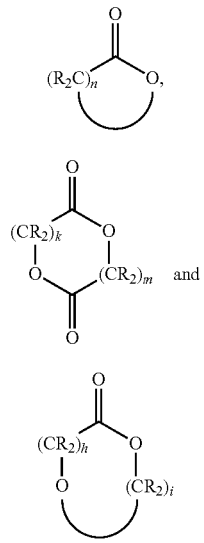

wherein n is 4 or 5, h, i, k, and m are independently 1 or 2 and each R is independently chosen from H or hydrocarbyl containing up to 12 carbon atoms; and
wherein the radical addition diluent is selected from the group consisting of epoxy acrylate monomer (ACE™ hydroxyl acrylate), isostearyl acrylate, heptadecyl acrylate, dicyclopentadiene acrylate, 3-ethyl-3-(methyl acrylate) oxetane (OXE-10), 3-ethyl-3-(methyl methacrylate) oxetane (OXE-30), 3,4-epoxycyclohexyl methyl methacrylate (S-100), acrylic macromer having a molecular weight (Mw) of less than 10,000 daltons, 2-acryloyloxypropyl phthalate (V2100), cycloaliphatic V2100, polyalkyl methacrylate (PAMA), alkoxylated tetrahydrofurfuryl (THF) acrylate of the following formula (1), tetrahydrofurfuryl acrylate (THFA or THF acrylate) of the following formula (4), and urethane acrylates having a molecular weight (Mw) of less than 2000 daltons,

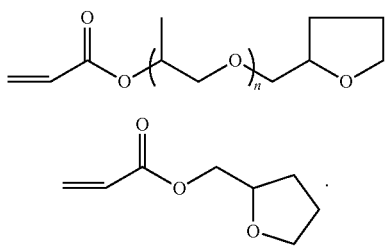

12. The composition of claim 1 wherein the acrylic backbone base polymer has a Mw of 25,000 to 1,000,000.

13. The composition of claim 10 wherein the non-reactive segment is non-reactive with the reactive functional group of the reactive segments.

14. The composition of claim 1 wherein the bodying component comprises an acrylic block base polymer, the acrylic block base polymer comprising one functional end segment and one non-reactive middle segment.

15. The composition of claim 14 wherein the non-reactive segment is non-reactive with the reactive functional group of the reactive segment.

16. The composition of claim 14 wherein the reactive segment includes one or more monomers of the non-reactive segment.

17. A cure in place liquid composition consisting of:
20-80 wt % of a bodying component including a pre-polymerized acrylic backbone base polymer having a molecular weight (Mw) of 5,000 to 1,000,000;
5-50 wt % of at least one structural diluent;
10-80 wt % of at least one radical addition diluent;
0-4.0 wt % crosslinker;
0-4.0 wt % of a first curative;
0.01-10 wt % of a second curative; and
0-10.0 wt % stabilizer/process aid,
wherein the structural diluent is selected from the group consisting of 3,4-epoxycyclohexylmethyl-3,4-epoxy-cyclohexanecarboxylate (S-21), Bis[(3,4-epoxycyclohexyl)methyl]adipate (S-28), difunctional bisphenol A/epichlorohydrin derived liquid epoxy resin (Epon 828), Bisphenol A epoxy resin having a weight per epoxide of 235-263 g/eq as measured by ASTM D1652 (Epon 834), beta-(3,4-epoxycyclohexyl)ethyltrimethoxysilane (A-186), gamma-glycidoxypropyltrimethoxysilane (A-187), glycidyl ester of neodecanoic acid (EP-10), isocyanate isocynate-functional urethane acrylate (Desmolux D100), isocyanate-bearing urethane acrylate (Desmolux D200), aliphatic polyisocyanate (low-viscosity hexamethylene diisocyanate (HDI) biuret) (Desmodur N3200), aliphatic polyisocyanate (hexamethylene diisocyanate (HDI) biuret) (Desmodur N100), aliphatic polyisocyanate (hexamethylene diisocynate (HDI) trimer) (Desmodur N3300), poly(propylene oxide) (PPO) oligomer having a molecular weight (Mw) of less than 5,000 daltons, trimethylolpropane oxetane (TMPO), poly(ethylene oxide) (PEO) oligomer having a molecular weight (Mw) of less than 5,000 daltons, ethyl hexyl oxetane (2EH oxetane), difunctional oxetane, trimethylolpropane triacrylate (TMPTA) of the following formula (5), tripropyleneglycol diacrylate (TPGDA) of the following formula (6), ethoxylated bisphenol A diacrylate of the following formula (7) in which n+m=3, ethoxylated trimethylolpropane triacrylate of the following formula (8), bisphenol A diglycidyl ether diacrylate of the following formula (9), 1,2-cyclic ethers, 1,3-cyclic ethers, 1,4-cyclic ethers, anhydrides, lactones, lactams, cyclic ethers, siloxanes, oxazolines, oxalidines, and bismaleimides;

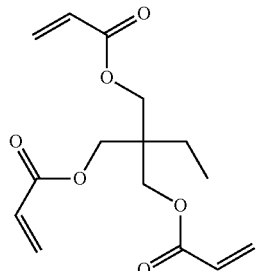
(5)

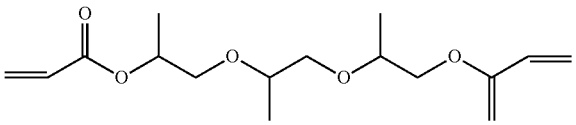
(6)

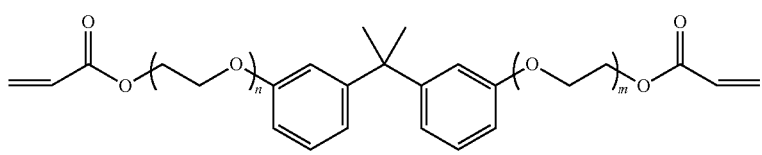
(7)

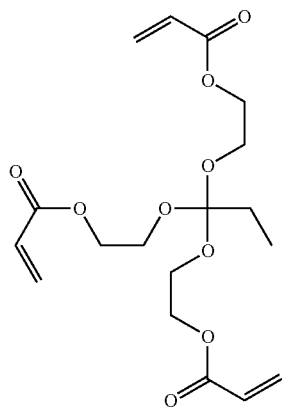
(8)

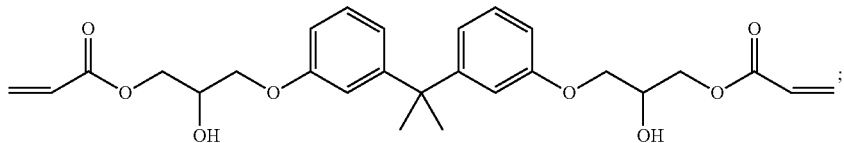
(9)

and wherein the radical addition diluent is selected from the group consisting of epoxy acrylate monomer (ACE™ hydroxyl acrylate), isostearyl acrylate, heptadecyl acrylate, dicyclopentadiene acrylate, 3-ethyl-3-(methyl acrylate) oxetane (OXE-10), 3-ethyl-3-(methyl methacrylate) oxetane (OXE-30), 3,4-epoxycyclohexyl methyl methacrylate (S-100), acrylic macromer having a molecular weight (Mw) of less than 10,000 daltons, 2-acryloyloxypropyl phthalate (V2100), 1,2-cyclohexanedicarboxylic acid, mono[1-methyl-2-[(1-oxo-2-propenyl)oxy]ethyl]ester (cycloaliphatic V2100), polyalkyl methacrylate (PAMA), alkoxylated tetrahydrofurfuryl (THF) acrylate of the following formula (1), hydroxyethyl acrylate of the following formula (2), phenoxyethylacrylate of the following formula (3), tetrahydrofurfuryl acrylate (THFA or THF acrylate) of the following formula (4), and urethane acrylates having a molecular weight (Mw) of less than 2000 daltons,

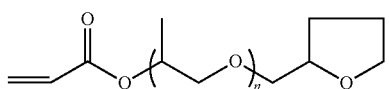
(1)

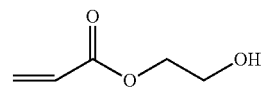
(2)

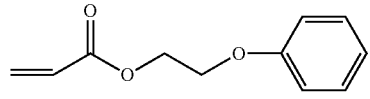
(3)

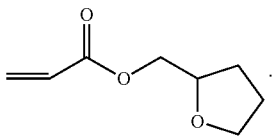
(4)

* * * * *